United States Patent
Takemoto et al.

(10) Patent No.: US 11,511,815 B2
(45) Date of Patent: Nov. 29, 2022

(54) BODY SIDE PANEL

(71) Applicant: NISSAN MOTOR CO., LTD., Yokohama (JP)

(72) Inventors: Shinichiro Takemoto, Kanagawa (JP); Toshikazu Torigaki, Kanagawa (JP); Tetsuro Naito, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/056,116

(22) PCT Filed: May 24, 2018

(86) PCT No.: PCT/JP2018/020019
§ 371 (c)(1),
(2) Date: Nov. 17, 2020

(87) PCT Pub. No.: WO2019/224984
PCT Pub. Date: Nov. 28, 2019

(65) Prior Publication Data
US 2021/0206434 A1 Jul. 8, 2021

(51) Int. Cl.
*B62D 25/02* (2006.01)
*B62D 29/00* (2006.01)

(52) U.S. Cl.
CPC ........... *B62D 29/004* (2013.01); *B62D 25/02* (2013.01)

(58) Field of Classification Search
CPC ...... B62D 25/02; B62D 25/025; B62D 25/04; B62D 25/06; B62D 25/08; B62D 25/20;
(Continued)

(56) References Cited

U.S. PATENT DOCUMENTS 6,474,726 B1 11/2002 Hanakawa et al.
8,383,242 B2 * 2/2013 Malek .................... C08L 77/06
114/355
(Continued)

FOREIGN PATENT DOCUMENTS

DE 19508970 A1 2/1996
DE 10100325 A1 7/2001
(Continued)

OTHER PUBLICATIONS

Wikipedia, Flexural Rigidy edited Jan. 26, 2022 (Year: 2022).*

*Primary Examiner* — Dennis H Pedder
(74) *Attorney, Agent, or Firm* — Foley & Lardner LLP

(57) ABSTRACT

Provided is a body side panel including: a hat-like panel member made of a metal; another panel member made of a metal; and a reinforcing member made of a resin. The hat-like panel member includes a cross-sectionally hat-like portion formed of a top portion, edge portions, and intermediate portions coupling the top portion and the edge portions to each other. The cross-sectionally hat-like portion is joined to the other panel member at the edge portions, and forms a closed space cooperatively with the other panel member. The reinforcing member is arranged to be joined to an at least one of the top portion and the intermediate portions in the closed space. The hat-like panel member includes corner parts between the edge portions and the intermediate portions. The other panel member includes corresponding parts which correspond to the corner parts, and a rigidity of the corresponding parts is higher than a rigidity of the corner parts.

9 Claims, 17 Drawing Sheets

(58) Field of Classification Search
CPC ............ B62D 25/2018; B62D 25/2027; B62D 25/2036; B62D 29/001; B62D 29/004; B62D 29/005; B62D 29/008; B62D 21/152; B62D 21/157
USPC .............. 296/209, 193.06, 203.03, 210, 204, 296/203.01
See application file for complete search history.

(56) References Cited

U.S. PATENT DOCUMENTS

| | | | |
|---|---|---|---|
| 10,583,629 B2* | 3/2020 | Imamura | ........... B29C 45/14377 |
| 2001/0020794 A1 | 9/2001 | Ishikawa | |
| 2010/0173125 A1 | 7/2010 | Malek et al. | |
| 2010/0187865 A1 | 7/2010 | Malek et al. | |
| 2016/0016609 A1 | 1/2016 | Kurokawa | |

FOREIGN PATENT DOCUMENTS

| | | |
|---|---|---|
| JP | 2001-48053 A | 2/2001 |
| JP | 2010-149511 A | 7/2010 |
| JP | 2010-168040 A | 8/2010 |
| JP | 2011-110971 A | 6/2011 |
| JP | 2015-680 A | 1/2015 |

* cited by examiner

BODY SIDE PANEL

TECHNICAL FIELD

The present invention relates to a body side panel. More specifically, the present invention relates to a body side panel including a hat-like panel member made of a metal, and another panel member made of a metal, and a reinforcing member made of a resin.

BACKGROUND ART

In the automobile industry, research and development of metal-plastic composite component have been made for the purpose of reducing weights of automobiles.

Hitherto, a hollow-chamber lightweight component that is formed of the metal-plastic composite, which has advantages such as high torsional stability, and which provides firmness of the metal-plastic composite even without perforations of metals or webs around the metals, has been proposed.

This lightweight component is formed of an aluminum base body having reinforcing structures. These reinforcing structures are firmly coupled to the aluminum base body, and are made of moulded-on thermoplastic. This thermoplastic includes a predetermined polymer moulding composition. A surface of this aluminum base body has been pretreated, for example, by acid treatment. Firm interlock connection between this aluminum base body and this thermoplastic is achieved by way of the surface of the aluminum base body, which has been pretreated, for example, by the acid treatment (refer to Patent Literature 1).

CITATION LIST

Patent Document

Patent Document 1: Japanese Patent Application Laid-open No. 2010-149511

SUMMARY OF INVENTION

Technical Problem

However, there has been a problem that an overall rigidity of the body side panel cannot be increased only by applying the technology disclosed in Patent Literature 1 for connecting the aluminum and the thermoplastic to each other by means of the aluminum surface that has been subjected to the acid treatment.

The present invention has been made to solve such problems in the conventional art, and an object of the present invention is to provide a body side panel capable of increasing an overall rigidity of the body side panel.

Solution to Problem

Through extensive studies for achieving this object, the inventors of the present invention have found that the object can be achieved, for example, by setting a rigidity of a predetermined part of the other panel member made of a metal to be higher than a rigidity of a predetermined part of the hat-like panel member made of a metal, the reinforcing member made of a resin having been joined to the hat-like panel member. In this way, the inventors have completed the present invention.

Advantageous Effects of Invention

According to the present invention, the body side panel capable of increasing the overall rigidity of the body side panel can be provided.

DESCRIPTION OF THE EMBODIMENTS

Figure 1:
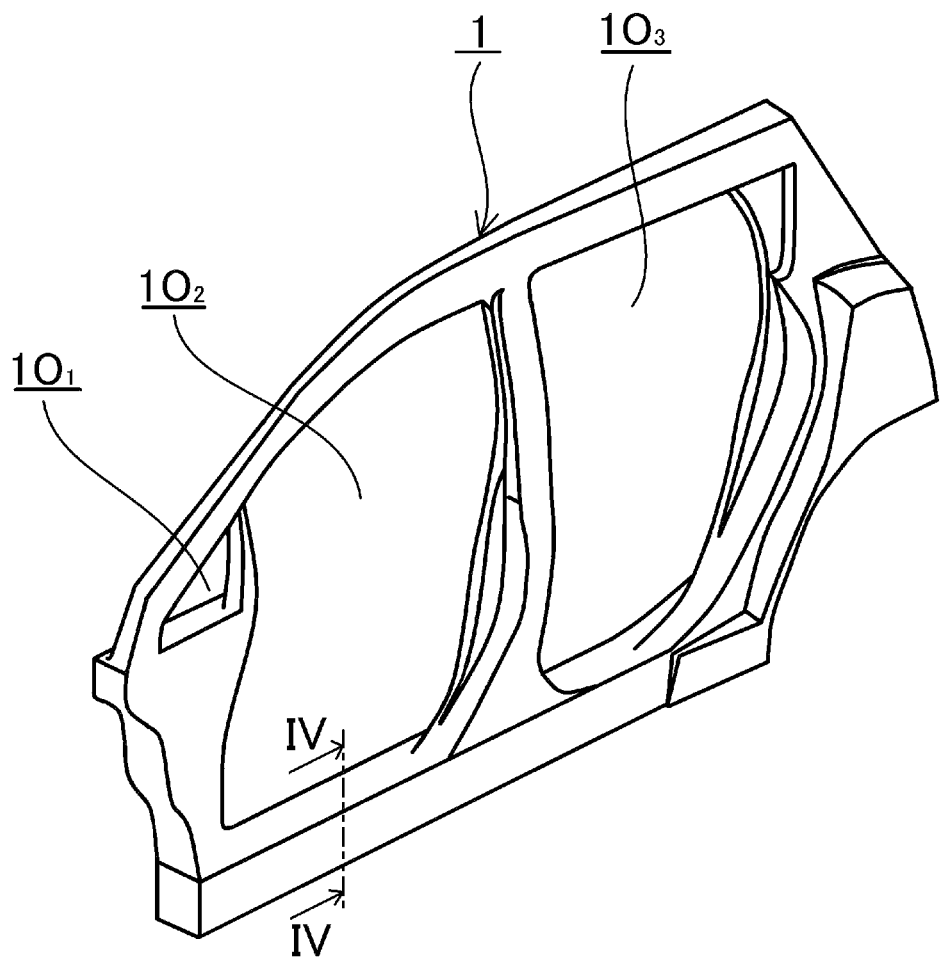
FIG. 1 is a schematic perspective view of a body side panel according to a first embodiment.

Now, a body side panel according to an embodiment of the present invention is described in detail with reference to the drawings.

First Embodiment

First, a body side panel according to a first embodiment is described in detail with reference to the drawings. Note that, a scale of dimensions in the drawings referred to in the embodiments described hereinbelow is exaggerated for the sake of convenience of description, and hence may be different from an actual scale.

Figure 2:
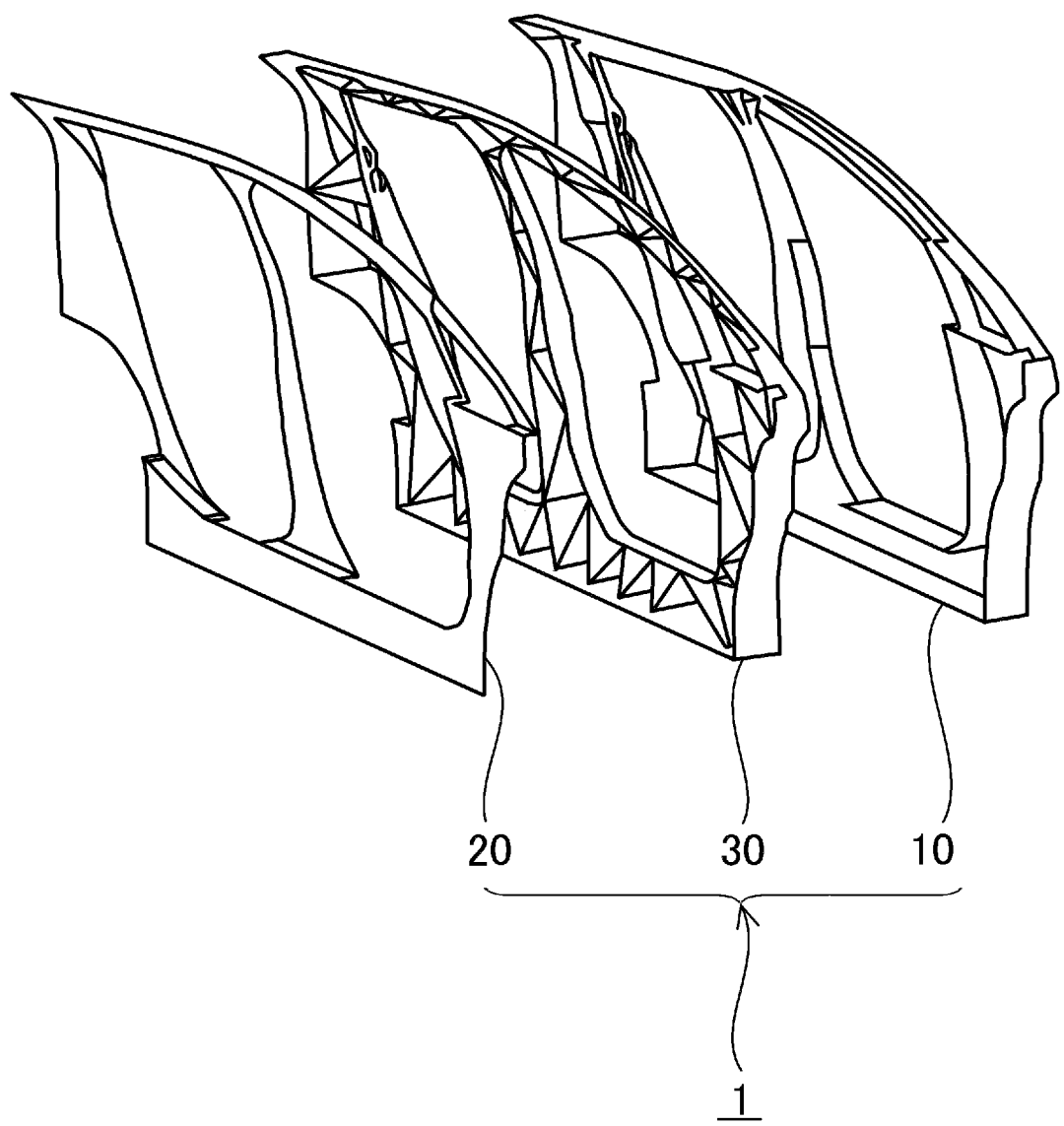
FIG. 2 is an exploded perspective view of the body side panel illustrated in FIG. 1.

FIG. 1 is a schematic perspective view of the body side panel according to the first embodiment. Note that, the body side panel in FIG. 1 is viewed from its outer-panel-member side. FIG. 2 is an exploded perspective view of the body side panel illustrated in FIG. 1. Note that, the body side panel in FIG. 2 is viewed from its inner-panel-member side.

As illustrated in FIG. 1 and FIG. 2, a body side panel 1 according to this embodiment includes a hat-like panel member 10 made of a metal, another panel member 20 made of a metal, and a reinforcing member 30 made of a resin. In other words, in the body side panel according to this embodiment, the hat-like panel member serves as the outer panel member, and the other panel member serves as the inner panel member. Note that, although not limited in particular, opening portions $1O_1$, $1O_2$, and $1O_3$ are formed through the body side panel 1 according to this embodiment. In addition, although not shown, various components such as a window and a door are assembled into these opening portions.

Figure 3:
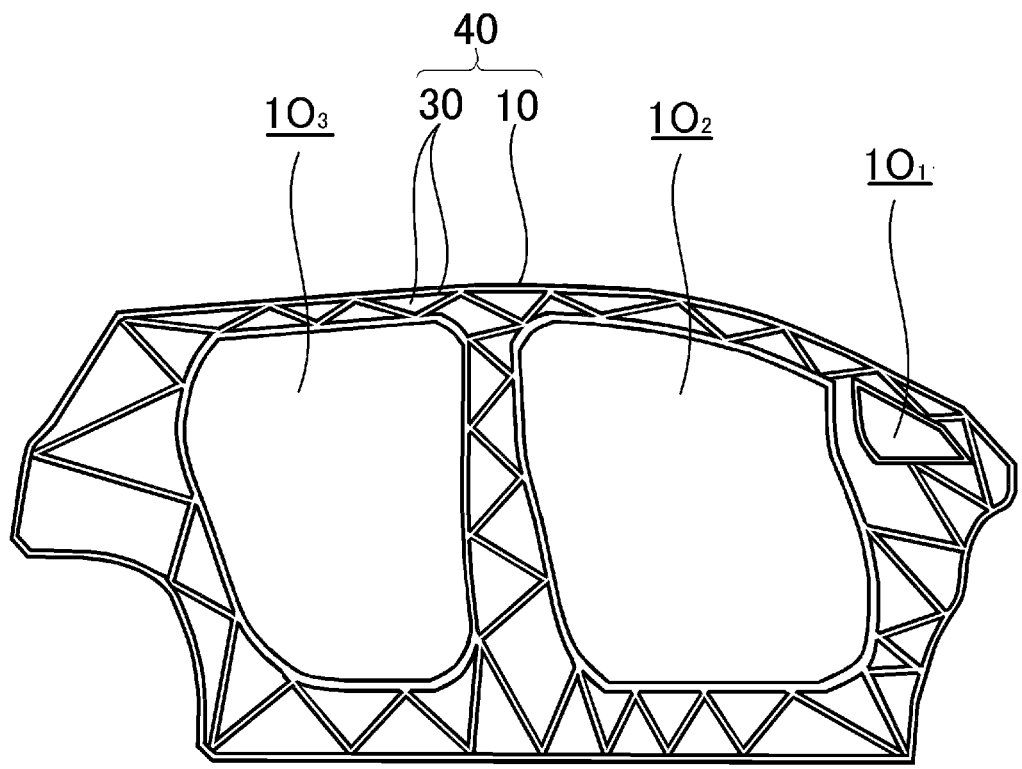
FIG. 3 is a schematic front view of an integral structure formed of the hat-like panel member and the reinforcing member illustrated in FIG. 2.
Figure 4:
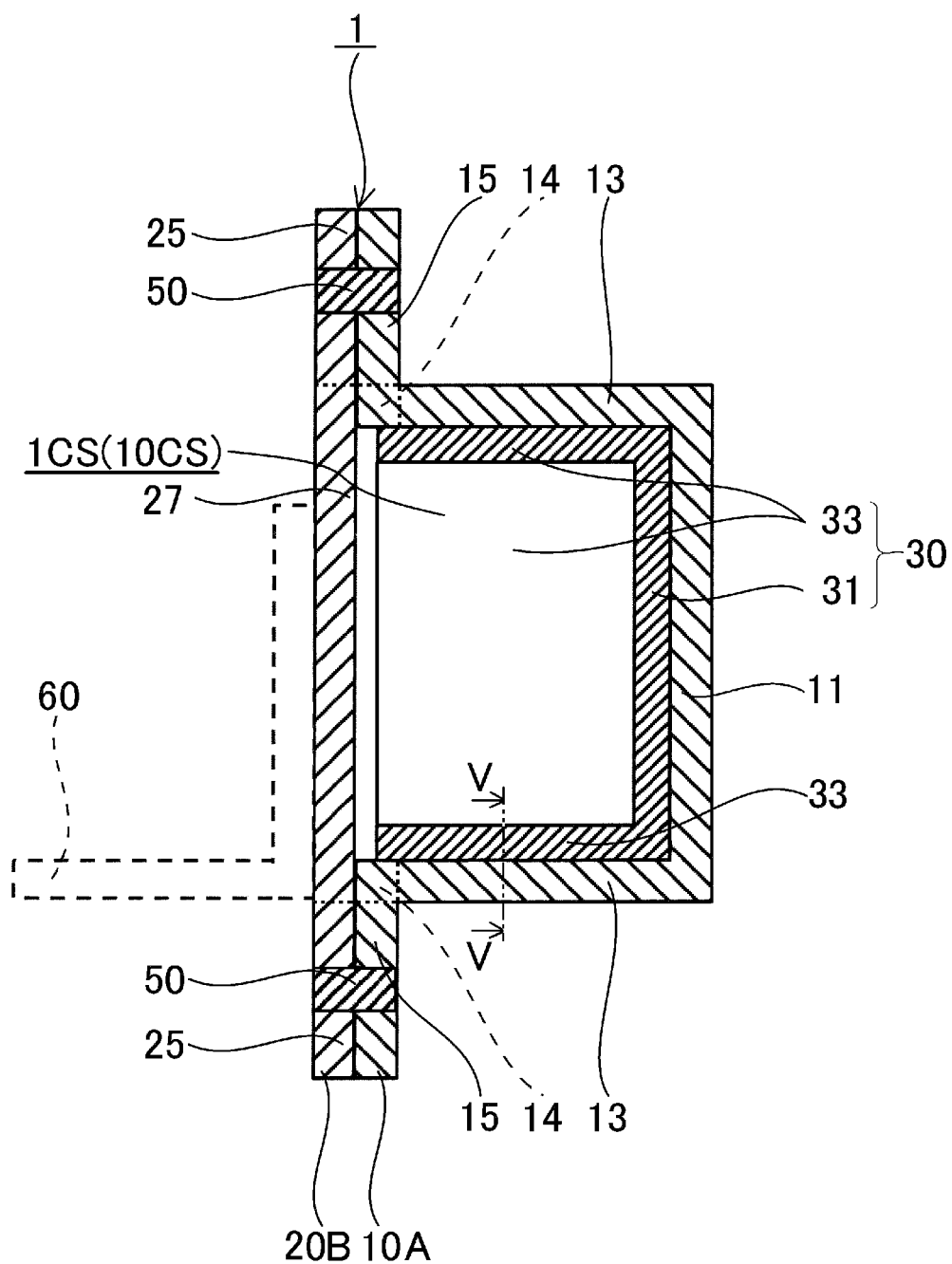
FIG. 4 is a schematic cross-sectional view of the body side panel illustrated in FIG. 1, which is taken along a line IV-IV.

FIG. 3 is a schematic front view of an integral structure formed of the hat-like panel member and the reinforcing member illustrated in FIG. 2. Note that, the integral structure in FIG. 3 is viewed from the inner-panel-member side. FIG. 4 is a schematic cross-sectional view of the body side panel illustrated in FIG. 1, which is taken along a line IV-IV. Note that, FIG. 4 is a cross-sectional view of a sill part of the body side panel illustrated in FIG. 1. In addition, in the body side panel according to this embodiment, other parts of the body side panel than the sill part may or need not have the same structure as that of the sill part. As examples of the other parts than the sill part, there may be mentioned parts such as a front pillar part, a center pillar part, a rear pillar part, and roof side-rail parts. As illustrated in FIG. 2 and FIG. 3, in the body side panel according to this embodiment, the parts such as the front pillar part, the center pillar part, the rear pillar part, and the roof side-rail parts may have structures different from that of the sill part. The same applies to the embodiments described hereinbelow.

As illustrated in FIG. 1 to FIG. 4, in the body side panel 1 according to this embodiment, the hat-like panel member 10 includes a cross-sectionally hat-like portion 10A formed of a top portion 11, edge portions 15, and intermediate portions 13 coupling the top portion 11 and the edge portions 15 to each other. Note that, in the body side panel 1 according to this embodiment, the other panel member 20 includes a cross-sectionally flat-plate-like portion 20B formed of a body portion 27 and edge portions 25.

Note that, the "cross-sectionally hat-like portion" does not refer only to the strict cross-sectionally hat-like portion including, in the cross-section taken along a thickness direction of the body side panel, the flat top portion, the flat intermediate portions, the flat edge portions, and corner parts between the top portion and the intermediate portions and between the intermediate portions and the edge portions. The "cross-sectionally hat-like portion" herein encompasses what is called substantially cross-sectionally hat-like portions in which a part of the top portion or the intermediate portions of the cross-sectionally hat-like portion is, for example, curved, protruded, or recessed.

In addition, the "cross-sectionally flat-plate-like portion" does not refer only to the strict cross-sectionally flat-plate-like portion including, in the cross-section taken along the thickness direction of the body side panel, the flat body portion and the flat edge portions. The "cross-sectionally flat-plate-like portion" herein encompasses what is called substantially cross-sectionally flat-plate-like portions in which a part of the body portion of the cross-sectionally flat-plate-like portion is, for example, curved, protruded, or recessed.

Further, as illustrated in FIG. 4, in the body side panel 1 according to this embodiment, the cross-sectionally hat-like portion 10A is joined to the cross-sectionally flat-plate-like portion 20B of the other panel member at the edge portions 15. Specifically, the edge portions 15 and the edge portions 25 are joined to each other with joint portions 50.

Note that, in assembling an automobile with use of the body side panel 1 according to this embodiment, as illustrated in FIG. 4, the cross-sectionally flat-plate-like portion 20B and a floor panel 60 of the other panel member are joined to each other. The other panel member and the floor panel are joined to each other by methods known in the art, such as fastening with bolts and welding.

Still further, as illustrated in FIG. 4, in the body side panel 1 according to this embodiment, the cross-sectionally hat-like portion 10A forms a closed space 1CS cooperatively with the other panel member 20.

Yet further, as illustrated in FIG. 4, in the body side panel 1 according to this embodiment, the reinforcing member 30 is arranged to be joined to both the top portion 11 and the intermediate portions 13 in the closed space 1CS.

In this way, by arranging the reinforcing member so that the reinforcing member is joined to an at least one of the top portion and the intermediate portions in the closed space, the cross-sectionally hat-like portion and the reinforcing member form the integral structure. As illustrated in FIG. 3, in the body side panel 1 according to this embodiment, the hat-like panel member 10 and the reinforcing member 30 forms an integral structure 40.

Note that, although not limited in particular, from a viewpoint of increasing an overall rigidity of the body side panel and a viewpoint of reducing a weight of the same, it is preferred that a rigidity of the integral structure formed of the hat-like panel member and the reinforcing member and a rigidity of the other panel member be equal to each other.

Specifically, the sentence "a rigidity of the integral structure formed of the hat-like panel member and the reinforcing member and a rigidity of the other panel member be equal to each other" does not represent only a case where both the rigidities are perfectly equal to each other. The sentence "a rigidity of the integral structure formed of the hat-like panel member and the reinforcing member and a rigidity of the other panel member be equal to each other" herein encompasses a case where the rigidity of the integral structure formed of the hat-like panel member and the reinforcing member and the rigidity of the other panel member are substantially equal to each other, specifically, the rigidities fall within a range of approximately ±5% of a rigidity in the case where both the rigidities are equal to each other.

Yet further, in the body side panel 1 according to this embodiment, the cross-sectionally hat-like portion 10A of the hat-like panel member 10 includes corner parts 14 between the edge portions 15 and the intermediate portions 13. Yet further, in the body side panel 1 according to this embodiment, the other panel member 20 includes corresponding parts which correspond respectively to the corner parts 14, and a rigidity of each of which is higher than a rigidity of a corresponding one of the corner parts 14.

Specifically, in the body side panel 1 according to this embodiment, the corresponding parts of the other panel member 20, which correspond respectively to the corner parts 14 of the hat-like panel member 10, refer to the body portion 27 of the cross-sectionally flat-plate-like portion 20B of the other panel member 20.

Note that, as the rigidities of the panel members, there may be mentioned a tensile rigidity, a flexural rigidity, a torsional rigidity, or arbitrary combinations of these rigidities. As long as parts of the body side panel can respectively secure rigidities required thereof, these rigidities may each be an at least one of the tensile rigidity, the flexural rigidity, and the torsional rigidity, the at least one satisfying the above-mentioned relationship. It is preferred that all the tensile rigidity, the flexural rigidity, and the torsional rigidity satisfy the above-mentioned relationship.

The respective rigidities of the panel members may each be represented, for example, by a value of a cross-sectional secondary moment of each of the panel members. Alternatively, the respective rigidities of the panel members may each be represented, for example, by a value calculated by computer simulation. Specifically, the respective rigidities of the panel members may each be represented by a value of an elastic modulus calculated through static analysis by the finite element method (FEM).

Note that, which of the respective rigidities of the panel members is higher can be determined, for example, on the basis of results of direct comparisons between the values of the cross-sectional secondary moments, or between the values of the elastic moduli, or on the basis of determination by software of the computer simulation. Alternatively, which of the respective rigidities of the panel members is higher may be determined, for example, on the basis of liability to deformation of the panel members in conducting, on the two panel members from which the reinforcing member has been removed, a peel test or a torsional test in accordance with "Routine Test of Resistance Spot And Projection Welds" (JIS Z 3144) according to Japanese Industrial Standards. Note that, in testing the rigidity of the above-described integral structure, the reinforcing member need not be removed.

Note that, the respective rigidities of the panel members can translate into respective deformation resistances of the panel members. In addition, the rigidity of the integral structure also can translate into a deformation resistance of the integral structure.

Yet further, as illustrated in FIG. 1, FIG. 2, and FIG. 4, in the body side panel 1 according to this embodiment, the reinforcing member 30 includes a layered portion 31 provided all over the top portion 11 of the cross-sectionally hat-like portion 10A, and a rib portion 33 provided in a state of protruding from the layered portion 31 to the other panel member 20 side.

Yet further, as illustrated in FIG. 4, in the body side panel 1 according to this embodiment, the reinforcing member 30 is provided in a region 10CS in the closed space 1CS, which is surrounded by the top portion 11 and the intermediate portions 13 of the cross-sectionally hat-like portion 10A. Note that, in the body side panel 1 according to this embodiment, the closed space 1CS and the region 10CS are the same as each other.

Now, the above-described components are described in more detail.

Metals to be contained in the hat-like panel member 10 and the other panel member 20 are not limited in particular as long as these metals are applicable to body side panels for automobiles. As examples, there may be mentioned iron alloys such as steel, and an aluminum alloy.

Specifically, both the hat-like panel member and the other panel member may be made of the iron alloy, or may be made of the aluminum alloy.

Alternatively, for example, one of the hat-like panel member and the other panel member may be made of the iron alloy, and another one of these panel members may be made of the aluminum alloy.

Further, although not limited in particular, from the viewpoints of increasing the overall rigidity of the body side panel and of reducing the weight of the same, it is preferred that, of the hat-like panel member and the other panel member, the hat-like panel member to which the reinforcing member has been joined be made of the aluminum alloy, and that the other panel member be made of the iron alloy. At this time, although not limited in particular, from the viewpoints of increasing the overall rigidity of the body side panel and of reducing the weight of the same, it is preferred that the other panel member, which is made of the iron alloy, include the cross-sectionally flat-plate-like portion.

Still further, although not limited in particular, from the viewpoint of reducing the weight of the body side panel, the other panel member to which the reinforcing member has not been joined preferably has a thickness of 3 mm or less, more preferably 0.7 mm to 3 mm.

The reinforcing member 30 is not limited in particular as long as the reinforcing member 30 is provided in the closed space formed between the two panel members, and as long as the reinforcing member 30 is arranged to be joined to an at least one of the top portion and the intermediate portions of the cross-sectionally hat-like portion.

Although not limited in particular, from the viewpoints of increasing the overall rigidity of the body side panel and of reducing the weight of the same, it is preferred that the reinforcing member include the layered portion provided all over the top portion of the cross-sectionally hat-like portion, and the rib portion provided in the state of protruding from the layered portion to the other-panel-member side. At this time, although not limited in particular, from the viewpoints of increasing the overall rigidity of the body side panel and of reducing the weight of the same, for example, the layered portion preferably has a thickness of 0.5 mm to 3.0 mm, more preferably 1.0 mm to 1.5 mm. In addition, although not limited in particular, from the viewpoints of increasing the overall rigidity of the body side panel and of reducing the weight of the same, for example, it is preferred that the rib portion have a height of approximately 200 mm at its high part.

Yet further, although not limited in particular, from the viewpoint of increasing the overall rigidity of the body side panel, it is preferred that the height of the rib portion be adjusted in accordance with rigidity required for each part of the body side panel. Yet further, also from the viewpoint of reducing the weight of the body side panel, it is preferred that the height of the rib portion be adjusted in accordance with a degree of weight reduction required for the body side panel. Thus, although not limited in particular, the rib portion of the reinforcing member need not have a fixed height, and it is preferred that the height of the rib portion of the reinforcing member vary from part to part of the body side panel.

Yet further, although not limited in particular, from the viewpoints of increasing the overall rigidity of the body side panel and of reducing the weight of the same, it is preferred that the reinforcing member includes the layered portion provided all over the top portion of the cross-sectionally hat-like portion, and the rib portion, which is formed of an at least one of a non-contact rib part provided in the state of protruding from the layered portion to the other-panel-member side, and of being kept out of contact with the intermediate portions of the cross-sectionally hat-like portion, and a contact rib part provided in the state of protruding from the layered portion to the other-panel-member side, and of being held in contact with the intermediate portions of the cross-sectionally hat-like portion.

Further, the reinforcing member is not limited in particular as long as the reinforcing member is applicable to body side panels for automobiles. As examples, there may be mentioned reinforcing members made of fiber reinforced resins such as a carbon-fiber reinforced resin and a glassfiber reinforced resin. As a preferred example of the carbon-fiber reinforced resin, from the viewpoints of increasing the overall rigidity of the body side panel and of reducing the weight of the same, there may be mentioned a carbon-fiber-reinforced thermoplastic resin.

Although not limited in particular, as examples of carbon fiber contained in the carbon-fiber-reinforced thermoplastic resin, there may be mentioned a regular tow formed of filaments each including approximately 1,000 to 24,000 monofilaments, and a large tow formed of filaments each including 40,000 or more monofilaments.

Further, although not limited in particular, as examples of the carbon fiber contained the carbon-fiber-reinforced thermoplastic resin, there may be mentioned discontinuous fiber such as long fiber strands each having a length of approximately 1 mm to 10 mm, and short fiber strands each having a length of approximately 0.1 mm to 1 mm.

Still further, although not limited in particular, as the carbon fiber contained in the carbon-fiber-reinforced thermoplastic resin, there may be used, for example, a recycled material or a non-woven fabric.

Although not limited in particular, as examples of resins contained in the carbon-fiber-reinforced thermoplastic resin, there may be mentioned polyamide (PA6), polyamide 66 (PA66), polypropylene (PP), polyether ether ketone (PEEK), and polyphenylene sulfide (PPS), meta-xylene diamine 6 (MXD6), and polynonamethylene terephthalamide (PAST).

Note that, by molding the reinforcing member with use of the carbon-fiber-reinforced thermoplastic resin to which the thermoplastic resin has been applied, an advantage that the above-described relatively-long discontinuous fiber strands can be contained in the carbon-fiber-reinforced thermoplastic resin is provided. Such relatively-long discontinuous fiber strands are likely to contribute to the increase in overall rigidity of the body side panel.

In addition, by molding the reinforcing member with use of the carbon-fiber-reinforced thermoplastic resin to which the thermoplastic resin has been applied, a large reinforcing member to be applied to a large body-side panel can be molded by an injection-press molding method in a short cycle time. In addition, when the reinforcing member is molded by the injection-press molding method, a shape of the rib portion can be freely designed. Specifically, it is preferred that, among the injection-press molding methods, an LFT-D (Long Fiber Thermoplastic-Direct) method suited to high-speed molding of large injection-press molds be applied.

Yet further, although not limited in particular, as raw materials of the carbon-fiber-reinforced thermoplastic resin, there may be used, for example, a pellet material containing the thermoplastic resin and the above-described discontinuous fiber formed of the long fiber strands, the short fiber strands and the like.

Yet further, although not limited in particular, as the raw materials of the carbon-fiber-reinforced thermoplastic resin, there may also be used, for example, a composite obtained by kneading a melt of the above-described thermoplastic resin and continuous fiber formed of the filaments, such as the above-described regular tow and large tow, a composite obtained by kneading a melt of the above-described thermoplastic resin and the above-described discontinuous fiber formed of the long fiber strands, the short fiber strands and the like, or a composite obtained by kneading a melt of the above-described thermoplastic resin and the above-mentioned recycled material or non-woven fabric.

Yet further, although not limited in particular, as the carbon-fiber-reinforced thermoplastic resin, there may also be used, for example, intermediate base materials such as a sheet molding compound (SMC) of the carbon-fiber-reinforced thermoplastic resin, carbon-fiber-tape-reinforced thermoplastics (CTT), or carbon-fiber-mat-reinforced thermoplastics (CMT).

Figure 5:
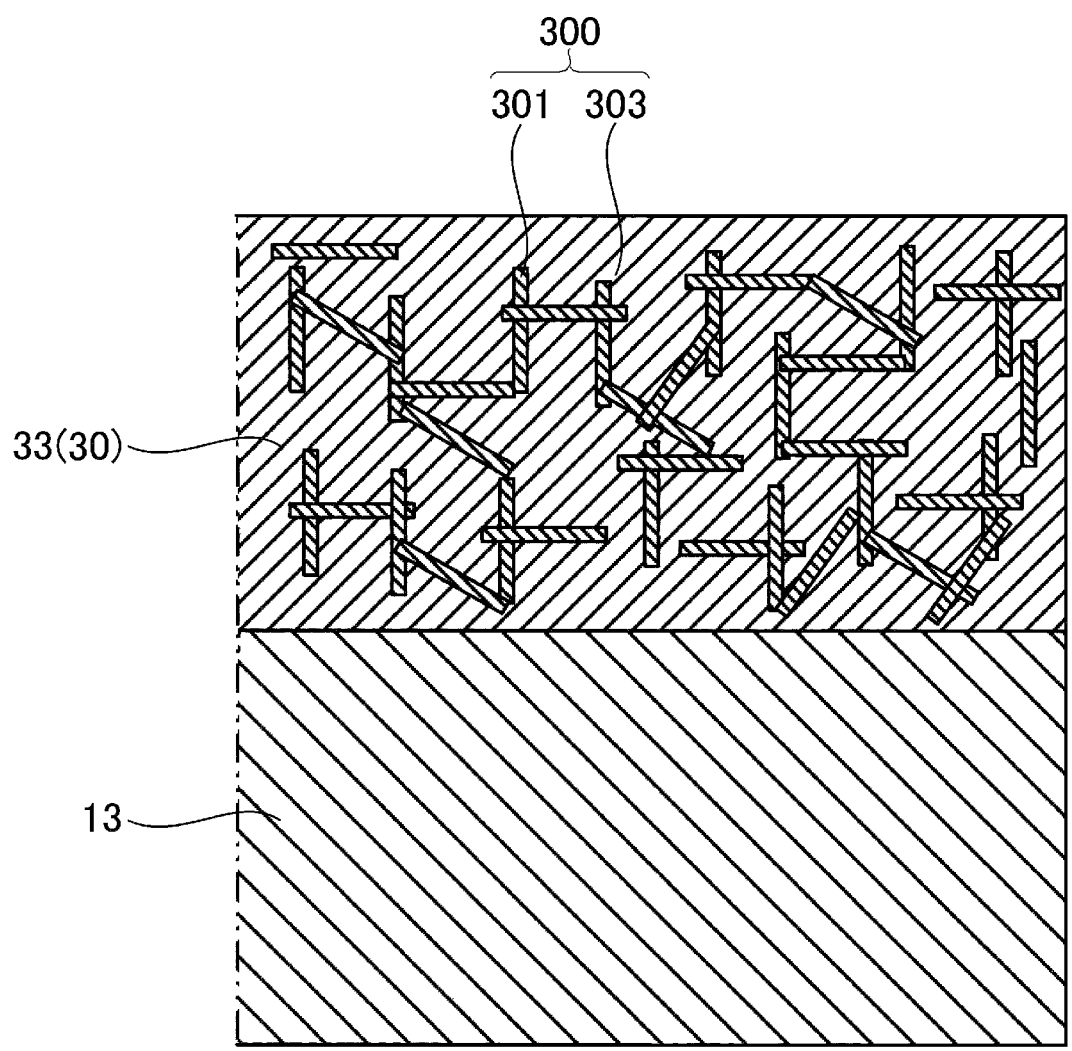
FIG. 5 is a schematic cross-sectional view of the body side panel illustrated in FIG. 4, which is taken along a line V-V.

Further, FIG. 5 is a schematic cross-sectional view of the body side panel illustrated in FIG. 4, which is taken along a line V-V. As illustrated in FIG. 5, in the body side panel 1 according to this embodiment, the reinforcing member 30 contains a carbon-fiber-reinforced thermoplastic resin 300. Thus, the rib portion 33, which is a part of the reinforcing member 30, also contains the carbon-fiber-reinforced thermoplastic resin 300. Note that, the carbon-fiber-reinforced thermoplastic resin 300 contains carbon-fiber strands 301 and a thermoplastic resin 303.

Still further, although not limited in particular, from the viewpoints of increasing the overall rigidity of the body side panel and of reducing the weight of the same, as illustrated in FIG. 5, in the body side panel 1 according to this embodiment, it is preferred that the carbon-fiber strands 301 in the carbon-fiber-reinforced thermoplastic resin 300 in the rib portion 33 be oriented in a direction orthogonal to a protruding direction of the rib portion 33. In other words, in FIG. 5, the carbon-fiber strands 301 are contained in the rib portion 33 in a state of extending along an in-plane direction of the drawing sheet. Note that, in FIG. 5, the "protruding direction of the rib portion" corresponds to a direction perpendicular to the drawing sheet, and the "direction orthogonal to the protruding direction of the rib portion" corresponds to the in-plane direction of the drawing sheet.

Yet further, although not limited in particular, the rib portion 33 as described above may be molded by utilizing, for example, the intermediate base materials such as the sheet molding compound (SMC) of the carbon-fiber-reinforced thermoplastic resin in which the orientation direction of the carbon-fiber strands are adjusted, the carbon-fiber-tape-reinforced thermoplastics (CTT), or the carbon-fiber-mat-reinforced thermoplastics (CMT).

The joint portions 50 are not limited in particular as long as the joint portions 50 are capable of joining the hat-like panel member and the other panel member to each other at their edge portions.

Although not limited in particular, as examples of the joint portions, there may be mentioned joint portions formed by welding methods known in the art, such as fusion welding, press contact, and brazing. Note that, the joint portions may contain constituent elements that are different from constituent elements contained in the two panel members. Further, the joint portions are not limited thereto, specifically, the joint portions need not necessarily contain the constituent elements that are different from the constituent elements contained in the two panel members, and may contain the same constituent elements as these constituent elements. At this time, respective percentages of the constituent elements in the two panel members and the joint portions may be equal to each other, or may be unequal to each other. In addition, joining other than the welding, such as rivet joining, SPR (Self-Pierce Riveting) joining, friction joining, and adhesive joining, may be used.

The body side panel as described above includes the hat-like panel member made of a metal, the other panel member made of a metal, and the reinforcing member made of a resin. Further, in this body side panel, the hat-like panel member includes the cross-sectionally hat-like portion including the top portion, the edge portions, and the intermediate portions coupling the top portion and the edge portions to each other. Still further, in this body side panel, the cross-sectionally hat-like portion is joined to the other panel member at the edge portions. Yet further, in this body side panel, the cross-sectionally hat-like portion forms the closed space cooperatively with the other panel member. Yet further, in this body side panel, the reinforcing member is arranged to be joined to an at least one of the top portion and the intermediate portions in the closed space. Yet further, in this body side panel, the hat-like panel member includes the corner parts between the edge portions and the intermediate portions, and the rigidity of each of the corresponding parts of the other panel member, which correspond to the corner parts, is higher than the rigidity of the corner parts. Thus, this body side panel is capable of increasing the rigidity of each of the corner parts of the hat-like panel member to which the reinforcing member has been joined, and the rigidity of each of the corresponding parts of the other panel member to which the reinforcing member has not been joined. Therefore, this body side panel is capable of increasing the overall rigidity of the body side panel.

Note that, as the overall rigidity of the body side panel, the flexural rigidity, the torsional rigidity, or both of these rigidities may be mentioned.

In addition, in assembling an automobile with use of the body side panel as described above, a rigidity of fastening the body side panel and the floor panel to each other can be increased.

In particular, the body side panel as described above is capable of increasing, while suppressing an increase in amount of the metals to be used and an increase in amount of the resins to be used, the rigidity of each of the corner parts of the hat-like panel member to which the reinforcing member has been joined, and the rigidity of each of the corresponding parts of the other panel member to which the reinforcing member has not been joined. Therefore, this body side panel is capable of increasing the overall rigidity of the body side panel while suppressing the increase in amount of the metals to be used and the increase in amount of the resins to be used.

Further, in the body side panel as described above, since the two panel members are joined to each other at the joint portions, there is an advantage that the reinforcing member need not be additionally heated to join the hat-like panel member to which this reinforcing member has been joined and the other panel member to each other. Still further, since the reinforcing member need not be additionally heated to join the hat-like panel member to which this reinforcing member has been joined and the other panel member to each other, there is another advantage that a state in which the reinforcing member and the hat-like panel member are joined to each other can be maintained. Yet further, a manufacturing procedure can be simplified, and hence there is an additional advantage that body side panels excellent in productivity can be obtained.

Yet further, in the body side panel as described above, since the two panel members are joined to each other at the joint portions, there is still another advantage that the reinforcing member need to be joined only to the hat-like panel member. Thus, the weight of the body side panel according to this embodiment, in which the reinforcing member is joined only to the hat-like panel member, can be reduced to be smaller than that of a body side panel in which the reinforcing member is joined to the two panel members.

Note that, the scope of the present invention encompasses the body side panel in which the reinforcing member is joined to the two panel members.

Further, in the body side panel as described above, from the viewpoints of increasing the overall rigidity of the body side panel and of reducing the weight of the same, it is preferred that the other panel member include the cross-sectionally flat-plate-like portion. A rigidity of the body portion of the cross-sectionally flat-plate-like portion is higher than the rigidity of each of the corner parts of the cross-sectionally hat-like portion. Thus, it is unnecessary, for example, to join the reinforcing member to the other panel member, or to increase the thickness of the other panel member.

In addition, since the other panel member includes the cross-sectionally flat-plate-like portion, the same area of the closed space in the cross section can be maintained even by increasing a length of each of the intermediate portions in the cross-sectionally hat-like portion of the hat-like panel member. Thus, the reinforcing member can be joined to the hat-like panel member in a state of being held in closer contact therewith.

Still further, in the body side panel as described above, from the viewpoints of increasing the overall rigidity of the body side panel and of reducing the weight of the same, it is preferred that the rigidity of the integral structure formed of the hat-like panel member and the reinforcing member and the rigidity of the other panel member be equal to each other. This body side panel is capable of further reducing the amounts of the resins to be used.

Yet further, in the body side panel as described above, from the viewpoint of increasing the overall rigidity of the body side panel, it is preferred that the reinforcing member include the layered portion provided all over the top portion of the cross-sectionally hat-like portion, and the rib portion provided in the state of protruding from the layered portion to the other-panel-member side. In joining the cross-sectionally hat-like portion and the rib portion to each other, an area of a joint interface between the cross-sectionally hat-like portion and the layered portion provided all over the rib portion and the top portion is larger than an area of a joint interface between the cross-sectionally hat-like portion and the rib portion. Thus, in the above-described body side panel, the reinforcing member can be joined to the cross-sectionally hat-like portion in a state of being held in closer contact therewith than in a body side panel in which the layered portion is not provided all over the top portion of the cross-sectionally hat-like portion.

Yet further, in the body side panel as described above, from the viewpoint of reducing the weight of the body side panel, it is preferred that the reinforcing member be provided in the region in the closed space, which is surrounded by the top portion and the intermediate portions of the cross-sectionally hat-like portion. In the hat-like panel member to which the reinforcing member has been joined, the reinforcing member, which is provided outside of the region surrounded by the top portion and the intermediate portions of the cross-sectionally hat-like portion, does not contribute to the increase in rigidity of each of the corner parts. Thus, this body side panel is capable of reducing an amount of the useless reinforcing member to be used, which does not contribute to the increase in rigidity. Note that, in the body side panel as described above, the other panel member including the cross-sectionally flat-plate-like portion and the reinforcing member can avoid interfering with each other.

Yet further, in the body side panel as described above, from the viewpoints of increasing the overall rigidity of the body side panel and of reducing the weight of the same, it is preferred that the hat-like panel member serve as the outer panel member. The integral structure formed of the outer panel member and the reinforcing member is capable of withstanding load or forced displacement from an outer side surface of the body side panel, thereby directly maintaining the overall rigidity of the body side panel.

Yet further, in the body side panel as described above, from the viewpoints of increasing the overall rigidity of the body side panel and of reducing the weight of the same, it is preferred that the reinforcing member contain the carbon-fiber-reinforced thermoplastic resin. By molding the reinforcing member with use of the carbon-fiber-reinforced thermoplastic resin, the advantage that the relatively-long discontinuous fiber strands can be contained in the carbon-fiber-reinforced thermoplastic resin is provided. Such relatively-long discontinuous fiber strands are likely to contribute to the increase in overall rigidity of the body side panel. In addition, when the reinforcing member contains the carbon-fiber-reinforced thermoplastic resin, strength of the body side panel is further increased.

Yet further, in the body side panel as described above, from the viewpoints of increasing the overall rigidity of the body side panel and of reducing the weight of the same, it is preferred that the reinforcing member include the layered portion provided all over the top portion of the cross-sectionally hat-like portion, and the rib portion provided in the state of protruding from the layered portion to the other-panel-member side, that the reinforcing member contain the carbon-fiber-reinforced thermoplastic resin, and that the carbon-fiber strands in the carbon-fiber-reinforced thermoplastic resin in the rib portion be oriented in the direction orthogonal to the protruding direction of the rib portion. By changing the direction in which the carbon-fiber strands in the carbon-fiber-reinforced thermoplastic resin contained in the reinforcing member are oriented, a rigidity in the direction in which the carbon-fiber strands are oriented is increased. When the carbon-fiber strands in the carbon-fiber-reinforced thermoplastic resin in the rib portion are oriented in the direction orthogonal to the protruding direction of the rib portion, force is likely to be transmitted in the direction orthogonal to the protruding direction of the rib portion. As a result, a rigidity of the rib portion is increased.

Second Embodiment

Next, a body side panel according to a second embodiment is described in detail with reference to the drawings. Note that, components that are similar to those described in the foregoing embodiment are denoted by the same reference symbols to omit redundant description.

Figure 6:
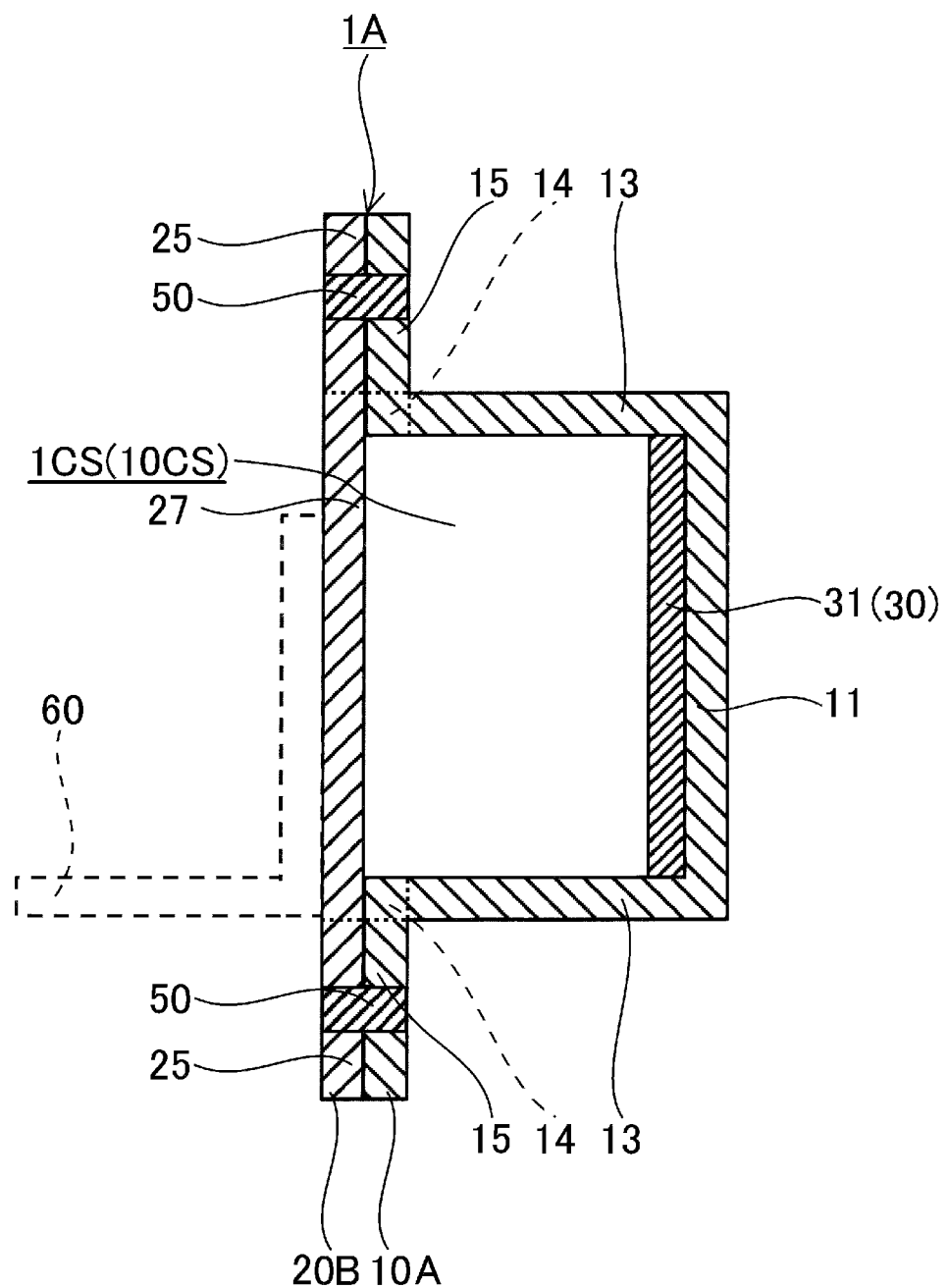
FIG. 6 is a schematic cross-sectional view of a main part of a body side panel according to a second embodiment.

FIG. 6 is a schematic cross-sectional view of a main part of the body side panel according to the second embodiment. Note that, FIG. 6 is a schematic cross-sectional view of the same part of the body side panel according to the second embodiment as that of the part illustrated in FIG. 1, which is taken along the line IV-IV.

As illustrated in FIG. 6, a body side panel 1A according to this embodiment is different from the body side panel 1 according to the foregoing first embodiment in the reinforcing member 30. Specifically, as illustrated in FIG. 6, in the body side panel 1A according to this embodiment, the reinforcing member 30 is arranged to be joined to the top portion 11 of the cross-sectionally hat-like portion 10A, and includes the layered portion 31 provided all over the top portion 11 of the cross-sectionally hat-like portion 10A.

In such a body side panel, similar to the body side panel according to the first embodiment, an overall rigidity of the body side panel can be increased, and a weight of the body side panel can be reduced. Note that, when the body side panel according to the second embodiment and the body side panel according to the first embodiment are compared to each other from the viewpoints of increasing the overall rigidities of the body side panels and of reducing the weights of the same, the body side panel according to the first embodiment is preferred.

Third Embodiment

Next, a body side panel according to a third embodiment is described in detail with reference to the drawings. Note that, components that are similar to those described in the foregoing embodiments are denoted by the same reference symbols to omit redundant description.

Figure 7:
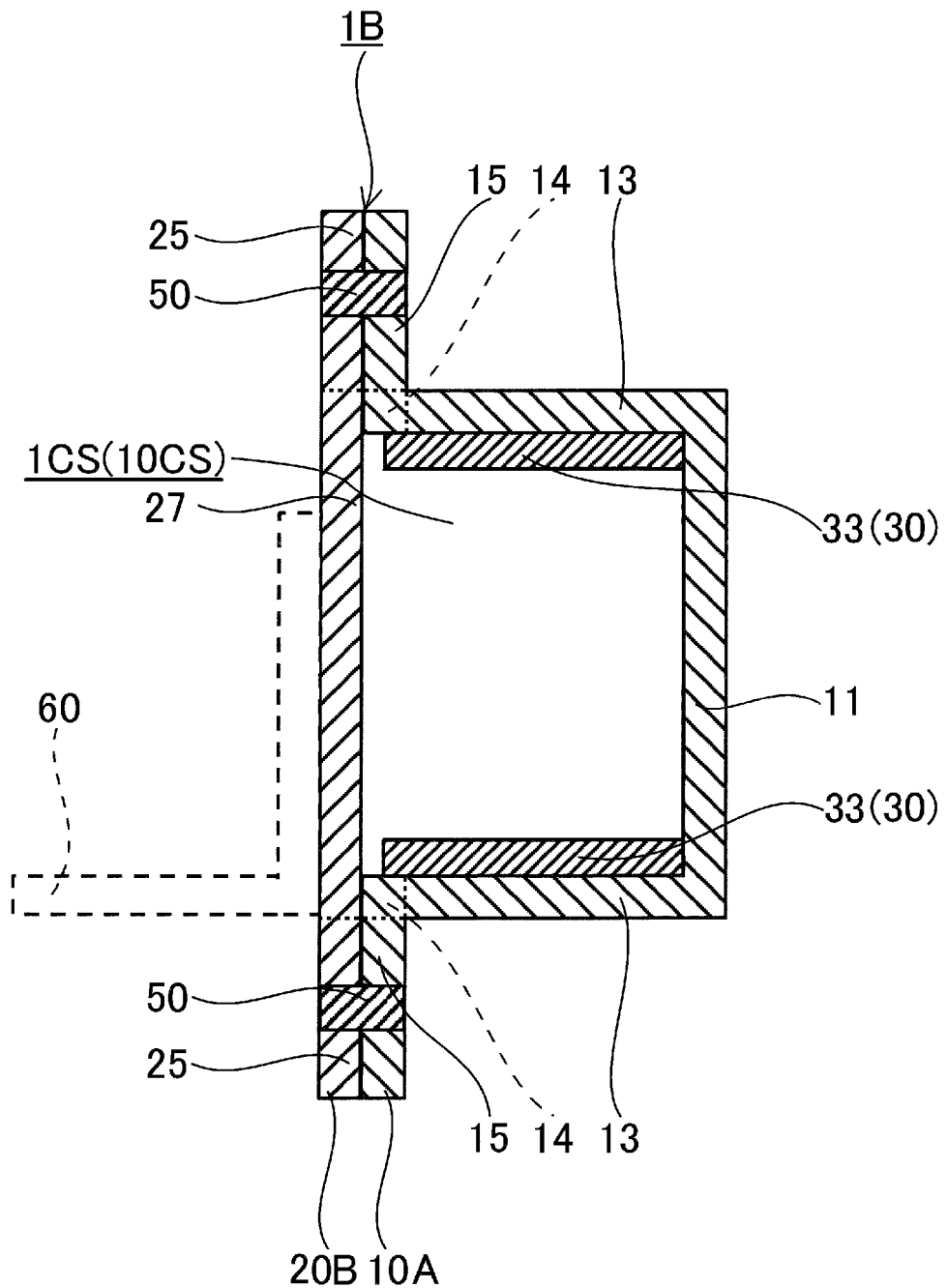
FIG. 7 is a schematic cross-sectional view of a main part of a body side panel according to a third embodiment.

FIG. 7 is a schematic cross-sectional view of a main part of the body side panel according to the third embodiment. Note that, FIG. 7 is a schematic cross-sectional view of the same part of the body side panel according to the third embodiment as that of the part illustrated in FIG. 1, which is taken along the line IV-IV.

As illustrated in FIG. 7, a body side panel 1B according to this embodiment is different from the body side panel 1 according to the foregoing first embodiment in the reinforcing member 30. Specifically, as illustrated in FIG. 7, in the body side panel 1B according to this embodiment, the reinforcing member 30 is arranged to be joined to the intermediate portions 13 of the cross-sectionally hat-like portion 10A, and includes the rib portion 33 provided in the state of being held in contact with the intermediate portions 13 of the cross-sectionally hat-like portion 10A.

In such a body side panel, similar to the body side panel according to the first embodiment, an overall rigidity of the body side panel can be increased, and a weight of the body side panel can be reduced. Note that, when the body side panel according to the third embodiment and the body side panel according to the first embodiment are compared to each other from the viewpoints of increasing the overall rigidities of the body side panels and of reducing the weights of the same, the body side panel according to the first embodiment is preferred.

Fourth Embodiment

Next, a body side panel according to a fourth embodiment is described in detail with reference to the drawings. Note that, components that are similar to those described in the foregoing embodiments are denoted by the same reference symbols to omit redundant description.

Figure 8:
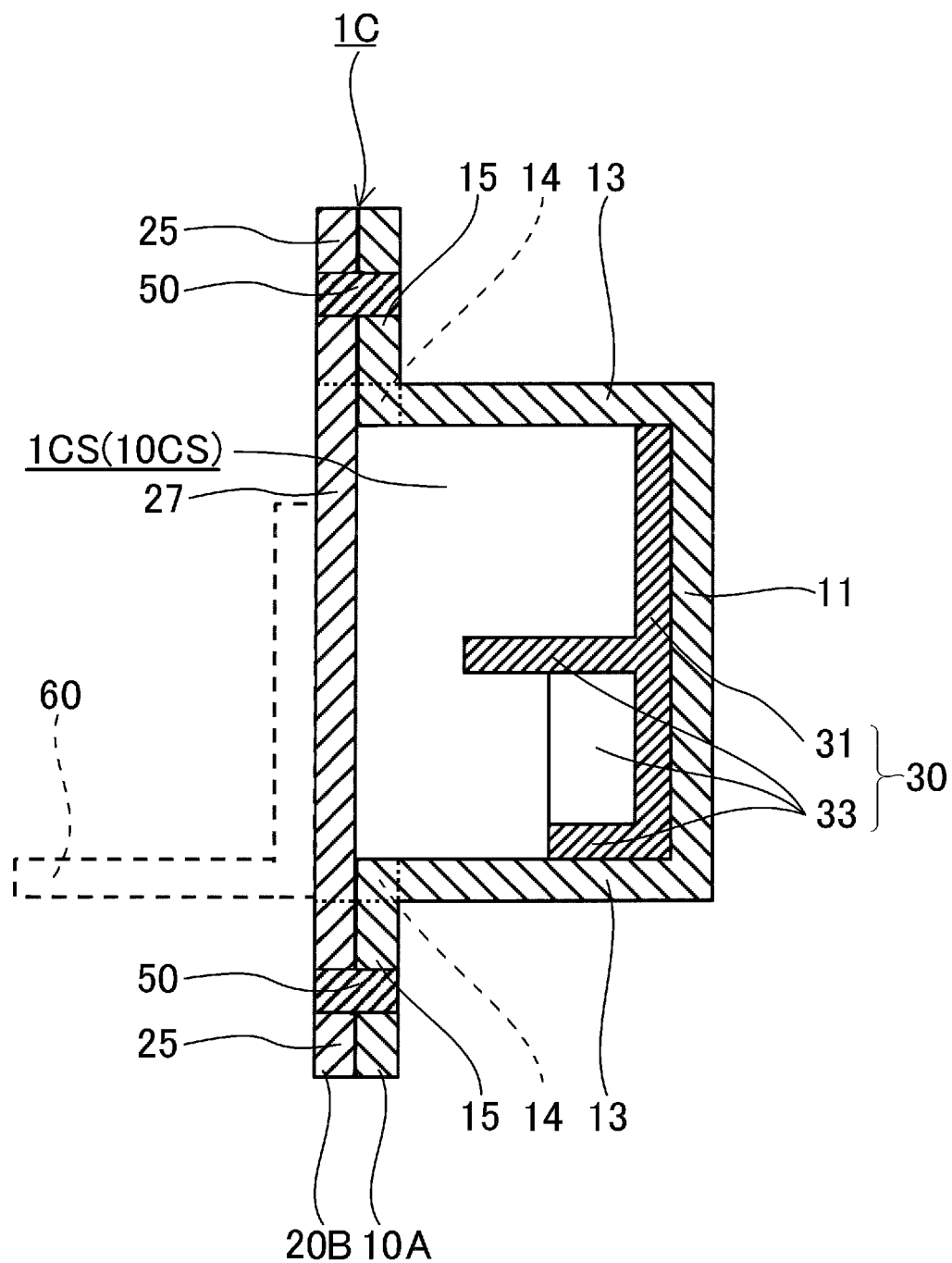
FIG. 8 is a schematic cross-sectional view of a main part of a body side panel according to a fourth embodiment.

FIG. 8 is a schematic cross-sectional view of a main part of the body side panel according to the fourth embodiment. Note that, FIG. 8 is a schematic cross-sectional view of the same part of the body side panel according to the fourth embodiment as that of the part illustrated in FIG. 1, which is taken along the line IV-IV.

As illustrated in FIG. 8, a body side panel 1C according to this embodiment is different from the body side panel 1 according to the foregoing first embodiment in the reinforcing member 30. Specifically, as illustrated in FIG. 8, in the body side panel 1C according to this embodiment, the reinforcing member 30 includes rib portions 33 provided in the state of protruding from the layered portion 31 to the cross-sectionally flat-plate-like portion 20B side of the other panel member, and of being kept out of contact with the intermediate portions 13 of the cross-sectionally hat-like portion 10A, and the other rib portions 33 provided in the state of protruding from the layered portion 31 to the cross-sectionally flat-plate-like portion 20B side of the other panel member, and of being held in contact with the intermediate portions 13 of the cross-sectionally hat-like portion 10A. In addition, these rib portions have different heights.

In such a body side panel, similar to the body side panel according to the first embodiment, an overall rigidity of the body side panel can be increased, and a weight of the body side panel can be reduced. Note that, when the body side panel according to the fourth embodiment and the body side panel according to the first embodiment are compared to each other from the viewpoints of increasing the overall rigidities of the body side panels and of reducing the weights of the same, the body side panel according to the first embodiment is preferred.

Fifth Embodiment

Next, a body side panel according to a fifth embodiment is described in detail with reference to the drawings. Note that, components that are similar to those described in the foregoing embodiments are denoted by the same reference symbols to omit redundant description.

Figure 9:
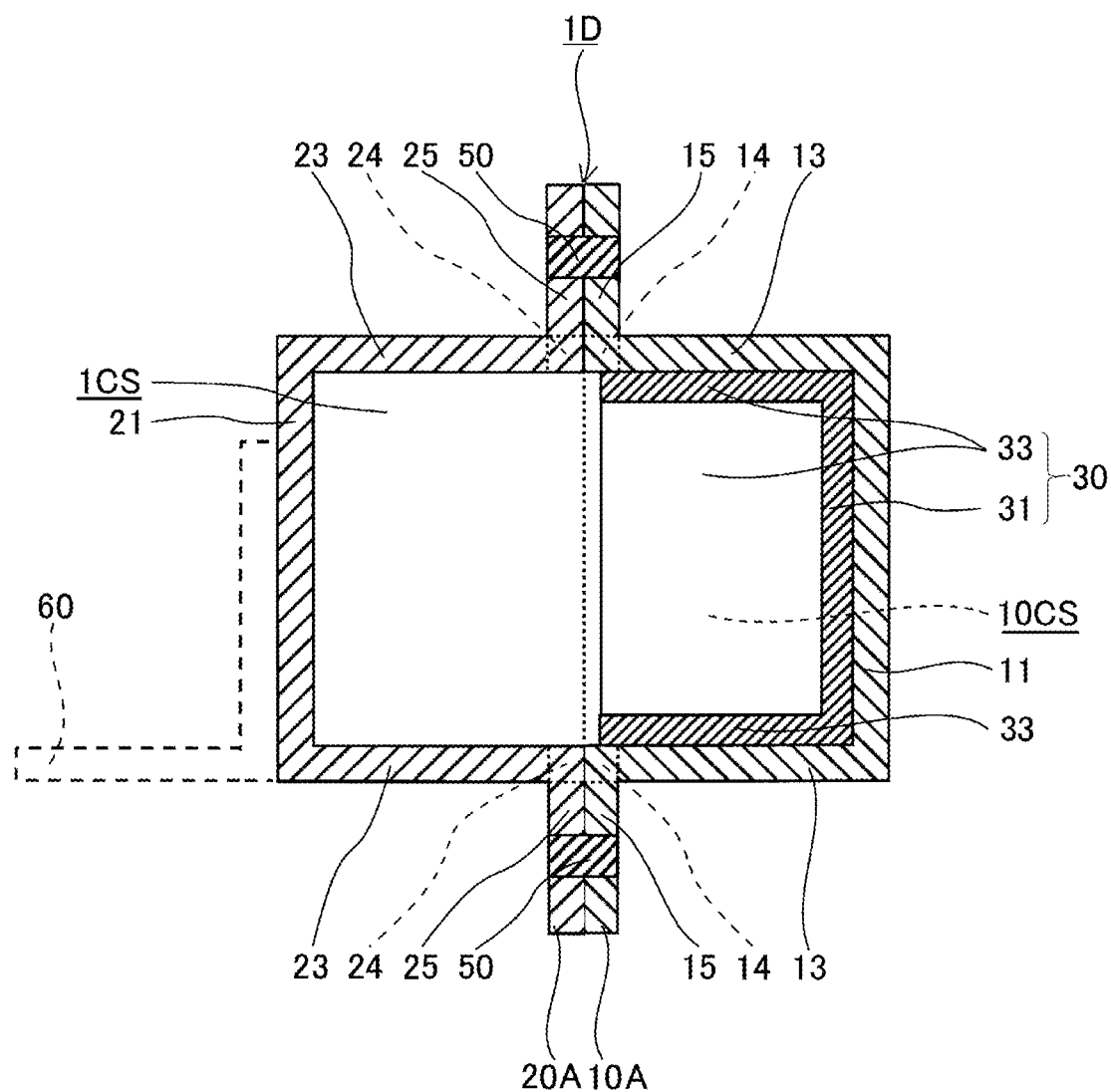
FIG. 9 is a schematic cross-sectional view of a main part of a body side panel according to a fifth embodiment.

FIG. 9 is a schematic cross-sectional view of a main part of the body side panel according to the fifth embodiment. Note that, FIG. 9 is a schematic cross-sectional view of the same part of the body side panel according to the fifth embodiment as that of the part illustrated in FIG. 1, which is taken along the line IV-IV.

As illustrated in FIG. 9, a body side panel 1D according to this embodiment is different from the body side panel 1 according to the foregoing first embodiment in the other panel member 20. Specifically, as illustrated in FIG. 9, in the body side panel 1D according to this embodiment, the other panel member 20 includes a cross-sectionally hat-like portion 20A formed of a top portion 21, the edge portions 25, and intermediate portions 23 coupling the top portion 21 and the edge portions 25 to each other. In addition, in the body side panel 1D according to this embodiment, the rigidity of each of the corresponding parts of the other panel member 20, which correspond to the corner parts 14, is higher than the rigidity of the corner parts 14. Note that, in the body side panel 1D according to this embodiment, the corresponding parts of the other panel member 20, which correspond to the corner parts 14 of the hat-like panel member 10, refer to corner parts 24 of the cross-sectionally hat-like portion 20A of the other panel member.

In such a body side panel, similar to the body side panel according to the first embodiment, an overall rigidity of the body side panel can be increased, and a weight of the body side panel can be reduced. Note that, when the body side panel according to the fifth embodiment and the body side panel according to the first embodiment are compared to each other from the viewpoints of increasing the overall rigidities of the body side panels and of reducing the weights of the same, the body side panel according to the first embodiment is preferred. In addition, the body side panel according to the fifth embodiment is capable of increasing the overall rigidity of the body side panel and of reducing the weight of the same without drastically changing cross-sectional shapes of the conventionally used two panel members.

Sixth Embodiment

Next, a body side panel according to a sixth embodiment is described in detail with reference to the drawings. Note that, components that are similar to those described in the foregoing embodiments are denoted by the same reference symbols to omit redundant description.

Figure 10:
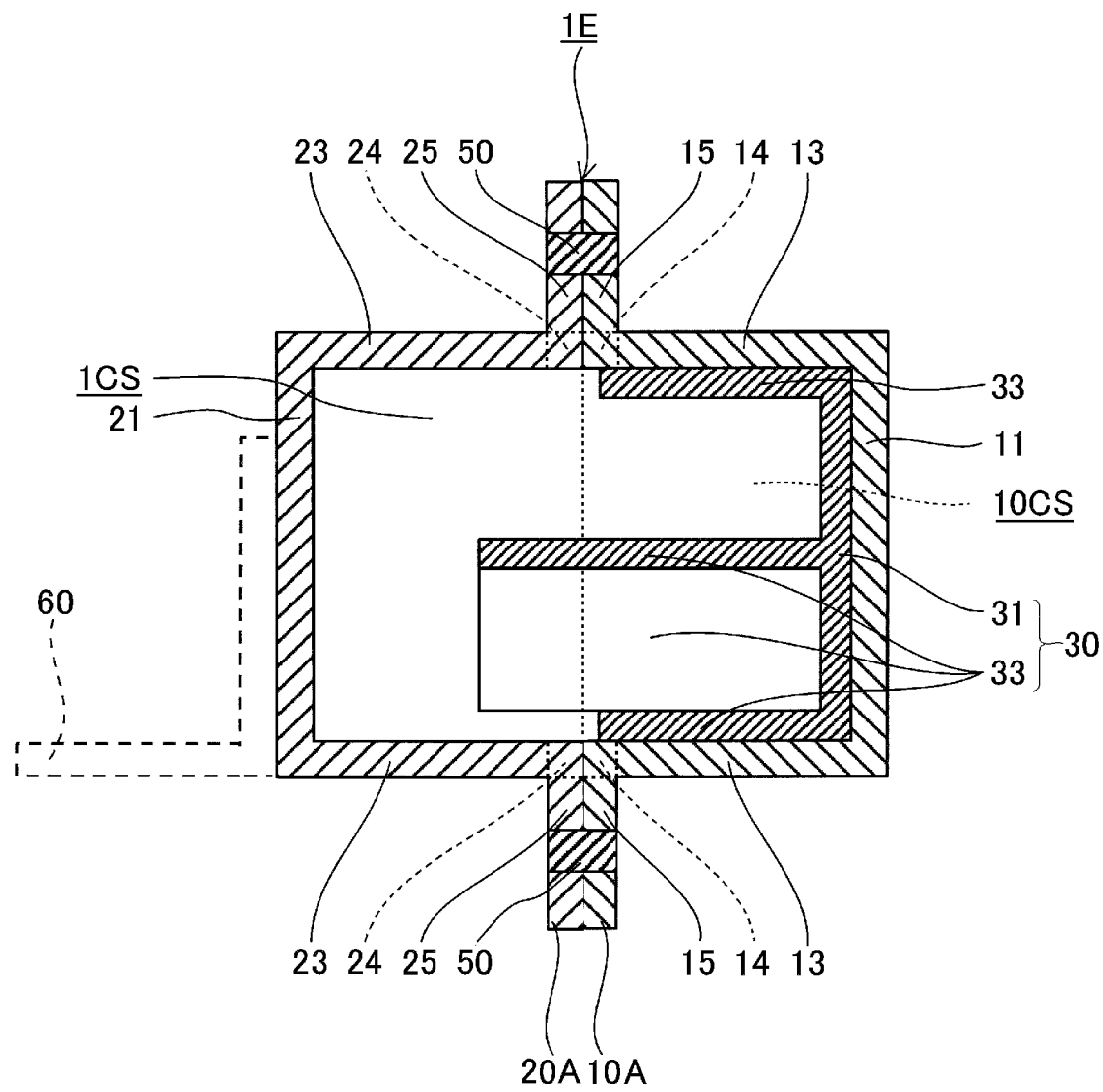
FIG. 10 is a schematic cross-sectional view of a main part of a body side panel according to a sixth embodiment.

FIG. 10 is a schematic cross-sectional view of a main part of the body side panel according to the sixth embodiment. Note that, FIG. 10 is a schematic cross-sectional view of the same part of the body side panel according to the sixth embodiment as that of the part illustrated in FIG. 1, which is taken along the line IV-IV.

As illustrated in FIG. 10, a body side panel 1E according to this embodiment is different from the body side panel 1D according to the foregoing fifth embodiment in the reinforcing member 30. Specifically, as illustrated in FIG. 10, in the body side panel 1E according to this embodiment, the reinforcing member 30 includes the rib portions 33 provided in the state of protruding from the layered portion 31 to the cross-sectionally hat-like portion 20A side of the other panel member, and of being kept out of contact with the intermediate portions 13 of the cross-sectionally hat-like portion 10A, and the other rib portions 33 provided in the state of protruding from the layered portion 31 to the cross-sectionally hat-like portion 20A side, and of being held in contact with the intermediate portions 13 of the cross-sectionally hat-like portion 10A. Further, the rib portions 33 provided in the state of being kept out of contact with the intermediate portions 13 are provided to protrude from the region 10CS in the closed space 1CS, which is surrounded by the top portion 11 and the intermediate portions 13 of the cross-sectionally hat-like portion 10A. Still further, these rib portions have different heights.

In such a body side panel, similar to the body side panel according to the fifth embodiment, an overall rigidity of the body side panel can be increased, and a weight of the body side panel can be reduced. Note that, when the body side panel according to the sixth embodiment and the body side panel according to the fifth embodiment are compared to each other from the viewpoints of increasing the overall rigidities of the body side panels and of reducing the weights of the same, the body side panel according to the fifth embodiment is preferred.

Seventh Embodiment

Next, a body side panel according to a seventh embodiment is described in detail with reference to the drawings. Note that, components that are similar to those described in the foregoing embodiments are denoted by the same reference symbols to omit redundant description.

Figure 11:
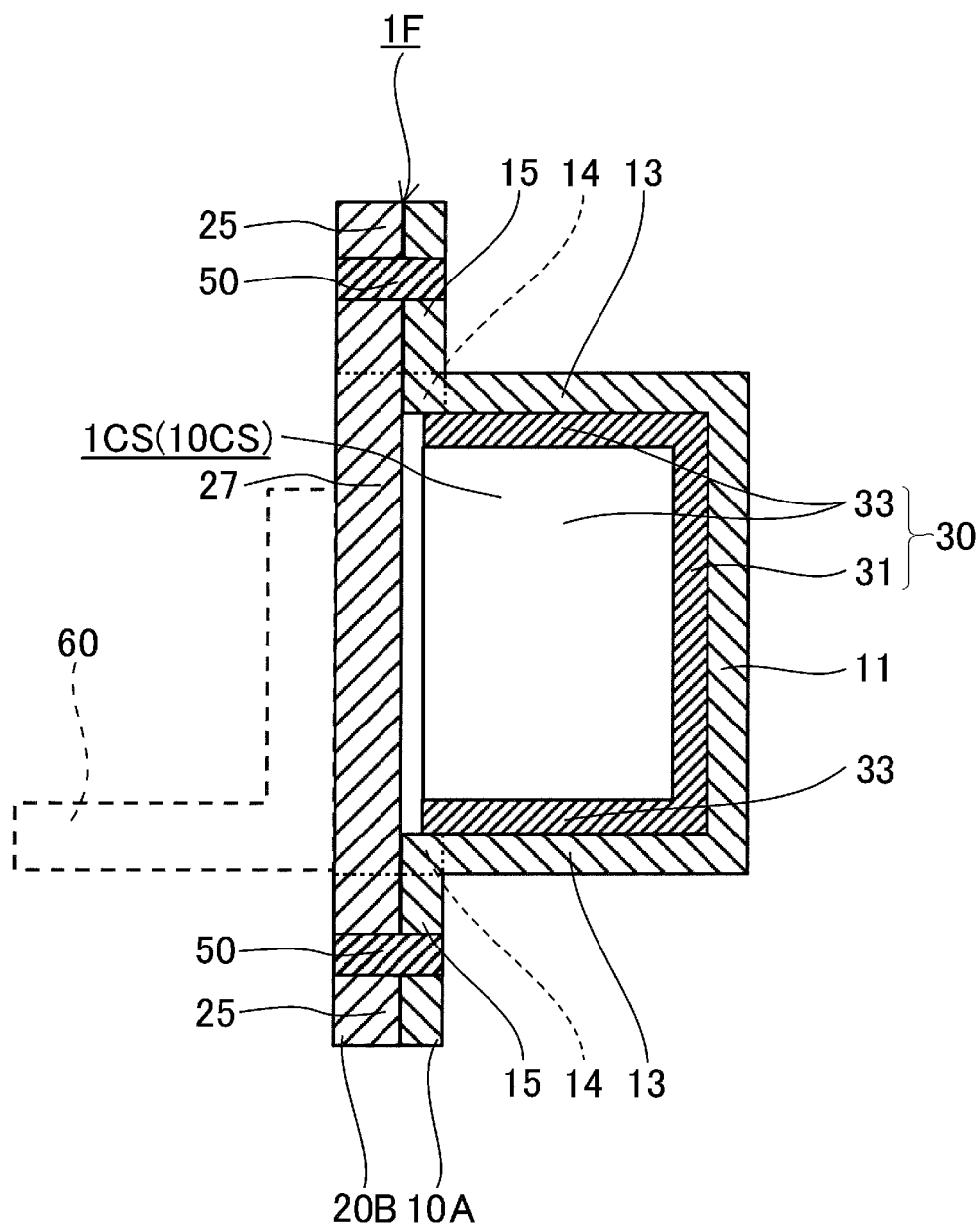
FIG. 11 is a schematic cross-sectional view of a main part of a body side panel according to a seventh embodiment.

FIG. 11 is a schematic cross-sectional view of a main part of the body side panel according to the seventh embodiment. Note that, FIG. 11 is a schematic cross-sectional view of the same part of the body side panel according to the seventh embodiment as that of the part illustrated in FIG. 1, which is taken along the line IV-IV.

As illustrated in FIG. 11, a body side panel 1F according to this embodiment is different from the body side panel 1 according to the foregoing first embodiment in the other panel member 20. Specifically, as illustrated in FIG. 11, in the body side panel 1F according to this embodiment, the thickness of the other panel member 20 is larger than a thickness of the hat-like panel member 10. In other words, in the body side panel 1F according to this embodiment, a thickness of the cross-sectionally flat-plate-like portion 20B is larger than a thickness of the cross-sectionally hat-like portion 10A. In addition, in the body side panel 1F according to this embodiment, the rigidity of the integral structure 40 formed of the hat-like panel member 10 and the reinforcing member 30 and the rigidity of the other panel member 20 are equal to each other. Note that, a thickness of the floor panel 60 is equivalent to the thickness of the cross-sectionally flat-plate-like portion 20B of the other panel member 20.

In such a body side panel, similar to the body side panel according to the first embodiment, an overall rigidity of the body side panel can be increased, and a weight of the body side panel can be reduced. Note that, when the body side panel according to the seventh embodiment and the body side panel according to the first embodiment are compared to each other from the viewpoints of increasing the overall rigidities of the body side panels and of reducing the weights of the same, the body side panel according to the seventh embodiment is preferred.

Eighth Embodiment

Next, a body side panel according to an eighth embodiment is described in detail with reference to the drawings. Note that, components that are similar to those described in the foregoing embodiments are denoted by the same reference symbols to omit redundant description.

Figure 12:
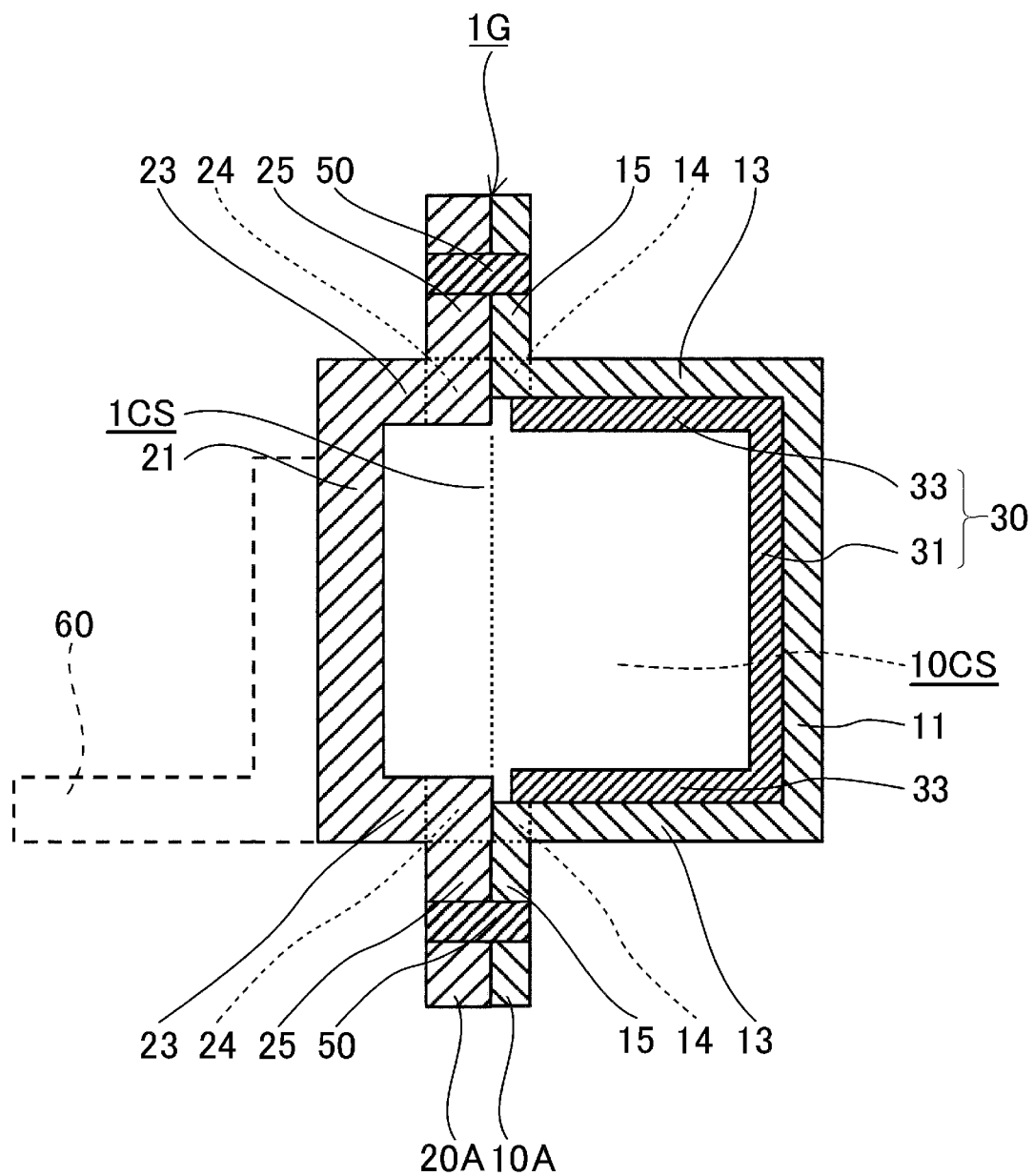
FIG. 12 is a schematic cross-sectional view of a main part of a body side panel according to an eighth embodiment.

FIG. 12 is a schematic cross-sectional view of a main part of the body side panel according to the eighth embodiment. Note that, FIG. 12 is a schematic cross-sectional view of the same part of the body side panel according to the eighth embodiment as that of the part illustrated in FIG. 1, which is taken along the line IV-IV.

As illustrated in FIG. 12, a body side panel 1G according to this embodiment is different from the body side panel 1D according to the foregoing fifth embodiment in the other panel member 20. Specifically, as illustrated in FIG. 12, in the body side panel 1G according to this embodiment, the thickness of the other panel member 20 is larger than the thickness of the hat-like panel member 10. In other words, in the body side panel 1G according to this embodiment, a thickness of the cross-sectionally hat-like portion 20A is larger than the thickness of the cross-sectionally hat-like portion 10A. Further, in the body side panel 1G according to this embodiment, not only the thicknesses of the two panel members, but also the cross-sectional shapes of the two panel members with respect to a line extending through the joint portions 50 are different from each other. Still further, in the body side panel 1G according to this embodiment, the rigidity of the integral structure 40 formed of the hat-like panel member 10 and the reinforcing member 30 and the rigidity of the other panel member 20 are equal to each other. Note that, the thickness of the floor panel 60 is equivalent to the thickness of the cross-sectionally hat-like portion 20A of the other panel member 20.

In such a body side panel, similar to the body side panel according to the first embodiment, an overall rigidity of the body side panel can be increased, and a weight of the body side panel can be reduced. Note that, when the body side panel according to the eighth embodiment and the body side panel according to the fifth embodiment are compared to each other from the viewpoints of increasing the overall rigidities of the body side panels and of reducing the weights of the same, the body side panel according to the eighth embodiment is preferred. In addition, the body side panel according to the eighth embodiment is capable of increasing the overall rigidity of the body side panel and of reducing the weight of the same without drastically changing the cross-sectional shapes of the conventionally used two panel members.

Ninth Embodiment

Next, a body side panel according to a ninth embodiment is described in detail with reference to the drawings. Note that, components that are similar to those described in the foregoing embodiments are denoted by the same reference symbols to omit redundant description.

Figure 13:
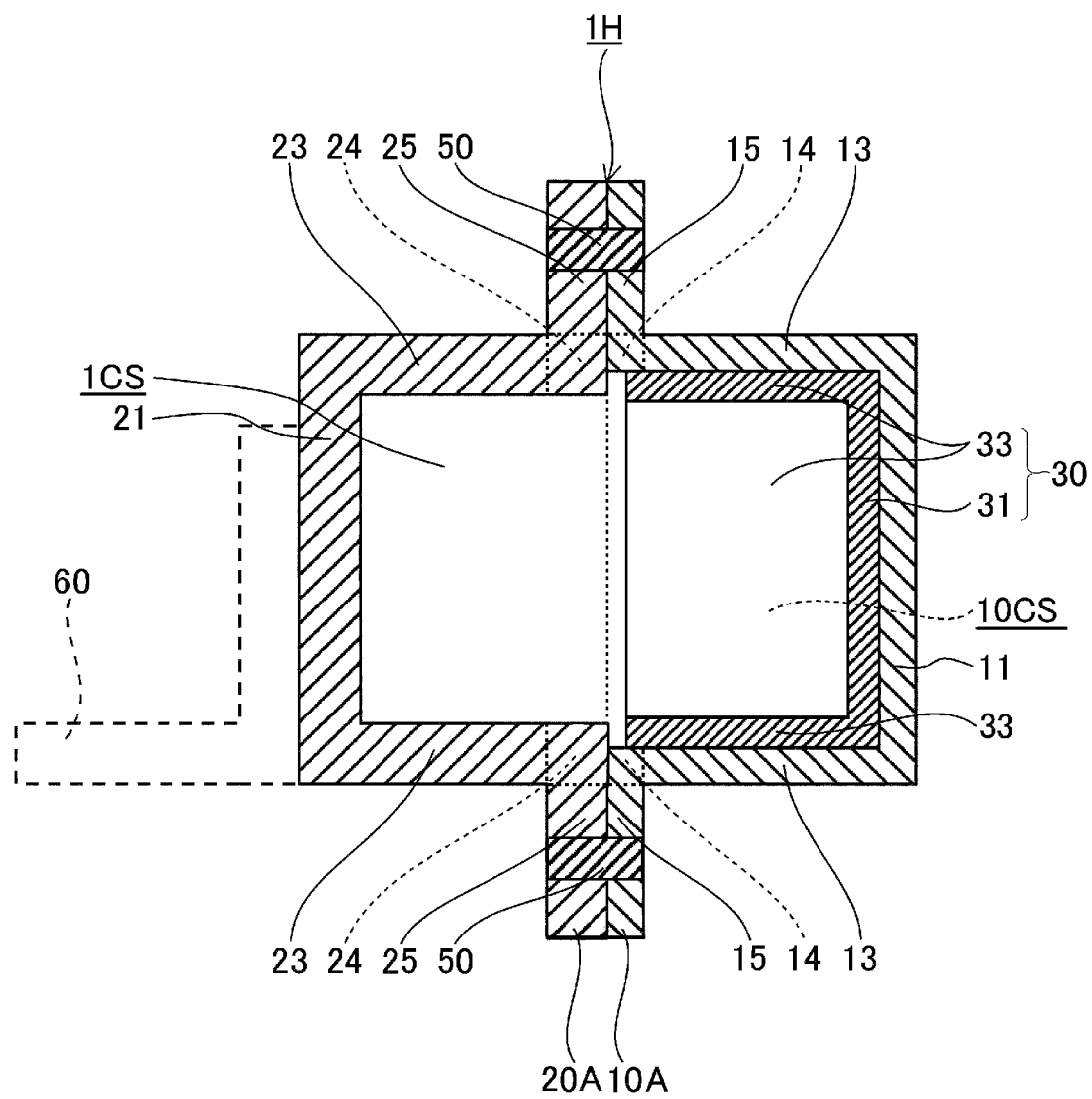
FIG. 13 is a schematic cross-sectional view of a main part of a body side panel according to a ninth embodiment.

FIG. 13 is a schematic cross-sectional view of a main part of the body side panel according to the ninth embodiment. Note that, FIG. 13 is a schematic cross-sectional view of the same part of the body side panel according to the ninth embodiment as that of the part illustrated in FIG. 1, which is taken along the line IV-IV.

As illustrated in FIG. 13, a body side panel 1H according to this embodiment is different from the body side panel 1D according to the foregoing fifth embodiment in the other panel member 20. Specifically, as illustrated in FIG. 13, in the body side panel 1H according to this embodiment, the thickness of the other panel member 20 is larger than the thickness of the hat-like panel member 10. In other words, in the body side panel 1H according to this embodiment, the thickness of the cross-sectionally hat-like portion 20A is larger than the thickness of the cross-sectionally hat-like portion 10A. Note that, the thickness of the floor panel 60 is equivalent to the thickness of the cross-sectionally hat-like portion 20A of the other panel member 20.

In such a body side panel, similar to the body side panel according to the first embodiment, an overall rigidity of the body side panel can be increased, and a weight of the body side panel can be reduced. Note that, when the body side panel according to the ninth embodiment and the body side panel according to the fifth embodiment are compared to each other from the viewpoints of increasing the overall rigidities of the body side panels and of reducing the weights of the same, the body side panel according to the ninth embodiment is preferred. Further, the body side panel according to the ninth embodiment is capable of increasing the overall rigidity of the body side panel and of reducing the weight of the same without drastically changing the cross-sectional shapes of the conventionally used two panel members. Still further, when the body side panel according to the ninth embodiment and the body side panel according to the eighth embodiment are compared to each other from the viewpoints of increasing the overall rigidities of the body side panels and of reducing the weights of the same, the body side panel according to the eighth embodiment is preferred.

Tenth Embodiment

Next, a body side panel according to a tenth embodiment is described in detail with reference to the drawings. Note that, components that are similar to those described in the foregoing embodiments are denoted by the same reference symbols to omit redundant description.

Figure 14:
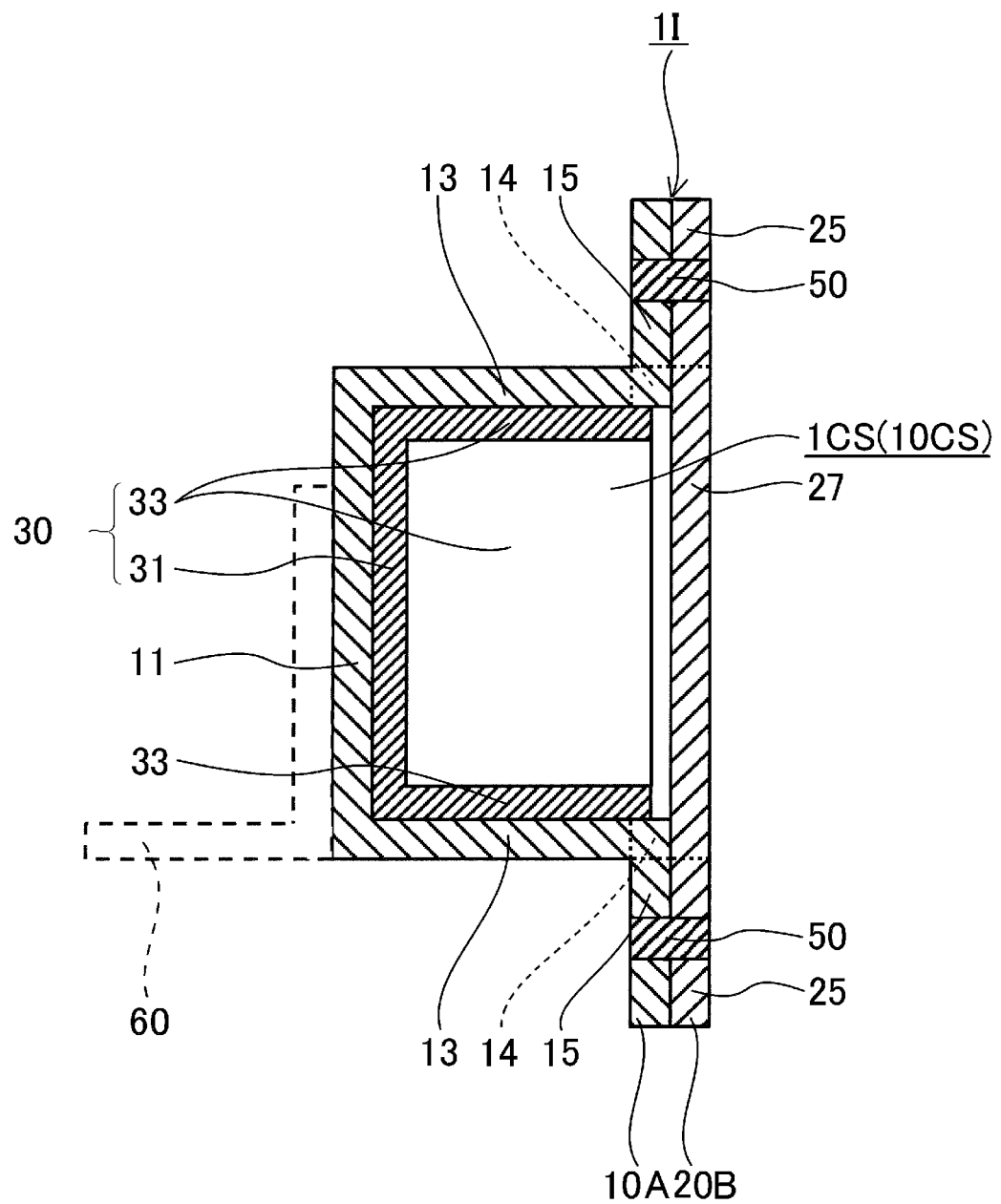
FIG. 14 is a schematic cross-sectional view of a main part of a body side panel according to a tenth embodiment.

FIG. 14 is a schematic cross-sectional view of a main part of the body side panel according to the tenth embodiment. Note that, FIG. 14 is a schematic cross-sectional view of the same part of the body side panel according to the tenth embodiment as that of the part illustrated in FIG. 1, which is taken along the line IV-IV.

As illustrated in FIG. 14, a body side panel 1I according to this embodiment is different from the body side panel 1 according to the foregoing first embodiment in that a structure of the body side panel is horizontally inverted with respect to the floor panel 60. In other words, as illustrated in FIG. 14, in the body side panel 1I according to this embodiment, the hat-like panel member 10 including the cross-sectionally hat-like portion 10A serves as the inner panel member, and the other panel member 20 including the cross-sectionally flat-plate-like portion 20B serves as the outer panel member.

In such a body side panel, similar to the body side panel according to the first embodiment, an overall rigidity of the body side panel can be increased, and a weight of the body side panel can be reduced. Note that, when the body side panel according to the tenth embodiment and the body side panel according to the first embodiment are compared to each other from the viewpoints of increasing the overall rigidities of the body side panels and of reducing the weights of the same, the body side panel according to the first embodiment is preferred. Further, in the body side panel according to this embodiment, by increasing a thickness of the outer panel member, the overall rigidity of the body side panel against the load or the forced displacement from the outer side surface of the body side panel can be increased. Still further, the reinforcing member need not be joined to the outer panel member, and hence formation of sink marks on the outer side surface of the outer panel member can be prevented. As a result, quality of an external appearance of a coating on the body side panel can be enhanced.

Eleventh Embodiment

Next, a body side panel according to an eleventh embodiment is described in detail with reference to the drawings. Note that, components that are similar to those described in the foregoing embodiments are denoted by the same reference symbols to omit redundant description.

Figure 15:
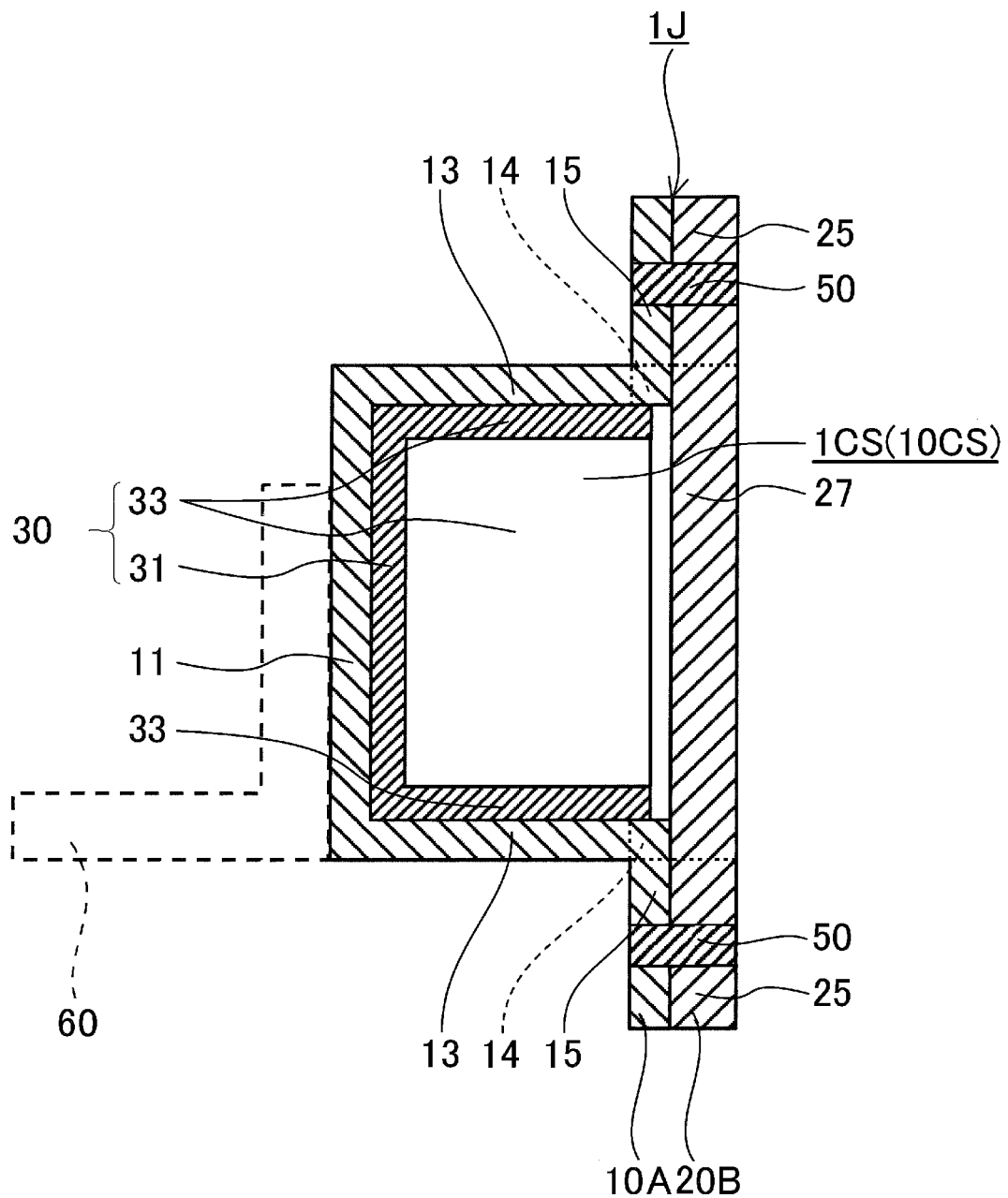
FIG. 15 is a schematic cross-sectional view of a main part of a body side panel according to an eleventh embodiment.

FIG. 15 is a schematic cross-sectional view of a main part of the body side panel according to the eleventh embodiment. Note that, FIG. 15 is a schematic cross-sectional view of the same part of the body side panel according to the eleventh embodiment as that of the part illustrated in FIG. 1, which is taken along the line IV-IV.

As illustrated in FIG. 15, a body side panel 1J according to this embodiment is different from the body side panel 1F according to the foregoing seventh embodiment in that the structure of the body side panel is horizontally inverted with respect to the floor panel 60. In other words, as illustrated in FIG. 15, in the body side panel 1J according to this embodiment, the hat-like panel member 10 including the cross-sectionally hat-like portion 10A serves as the inner panel member, and the other panel member 20 including the cross-sectionally flat-plate-like portion 20B serves as the outer panel member.

In such a body side panel, similar to the body side panel according to the seventh embodiment, an overall rigidity of the body side panel can be increased, and a weight of the body side panel can be reduced. Note that, when the body side panel according to the eleventh embodiment and the body side panel according to the seventh embodiment are compared to each other from the viewpoints of increasing the overall rigidities of the body side panels and of reducing the weights of the same, the body side panel according to the seventh embodiment is preferred. Further, in the body side panel according to this embodiment, by increasing the thickness of the outer panel member, the overall rigidity of the body side panel against the load or the forced displacement from the outer side surface of the body side panel can be increased. Still further, the reinforcing member need not be joined to the outer panel member, and hence the formation of the sink marks on the outer side surface of the outer panel member can be prevented. As a result, the quality of the external appearance of the coating on the body side panel can be enhanced.

Twelfth Embodiment

Next, a body side panel according to a twelfth embodiment is described in detail with reference to the drawings. Note that, components that are similar to those described in the foregoing embodiments are denoted by the same reference symbols to omit redundant description.

Figure 16:
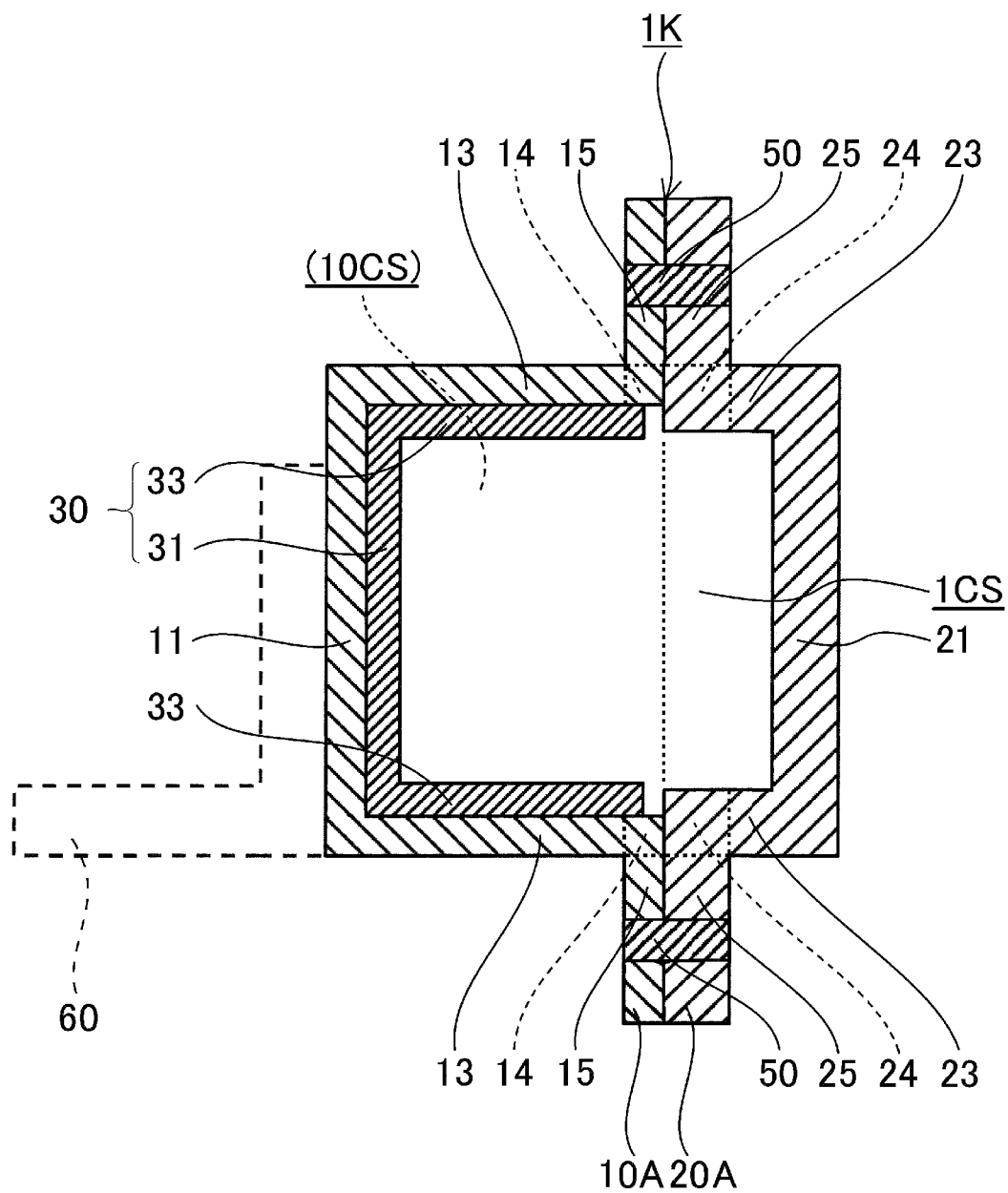
FIG. 16 is a schematic cross-sectional view of a main part of a body side panel according to a twelfth embodiment.

FIG. 16 is a schematic cross-sectional view of a main part of the body side panel according to the twelfth embodiment. Note that, FIG. 16 is a schematic cross-sectional view of the same part of the body side panel according to the twelfth embodiment as that of the part illustrated in FIG. 1, which is taken along the line IV-IV.

As illustrated in FIG. 16, a body side panel 1K according to this embodiment is different from the body side panel 1G according to the foregoing eighth embodiment in that the structure of the body side panel is horizontally inverted with respect to the floor panel 60. In other words, as illustrated in FIG. 16, in the body side panel 1K according to this embodiment, the hat-like panel member 10 including the cross-sectionally hat-like portion 10A serves as the inner panel member, the other panel member 20 including the cross-sectionally flat-plate-like portion 20B serves as the outer panel member, and the reinforcing member 30 is joined to the inner panel member.

In such a body side panel, similar to the body side panel according to the eighth embodiment, an overall rigidity of the body side panel can be increased, and a weight of the body side panel can be reduced. Note that, when the body side panel according to the twelfth embodiment and the body side panel according to the eighth embodiment are compared to each other from the viewpoints of increasing the overall rigidities of the body side panels and of reducing the weights of the same, the body side panel according to the eighth embodiment is preferred. Further, in the body side panel according to this embodiment, by increasing the thickness of the outer panel member, the overall rigidity of the body side panel against the load or the forced displacement from the outer side surface of the body side panel can be increased. Still further, the reinforcing member need not be joined to the outer panel member, and hence the formation of the sink marks on the outer side surface of the outer panel member can be prevented. As a result, the quality of the external appearance of the coating on the body side panel can be enhanced.

Thirteenth Embodiment

Next, a body side panel according to a thirteenth embodiment is described in detail with reference to the drawings. Note that, components that are similar to those described in the foregoing embodiments are denoted by the same reference symbols to omit redundant description.

Figure 17:
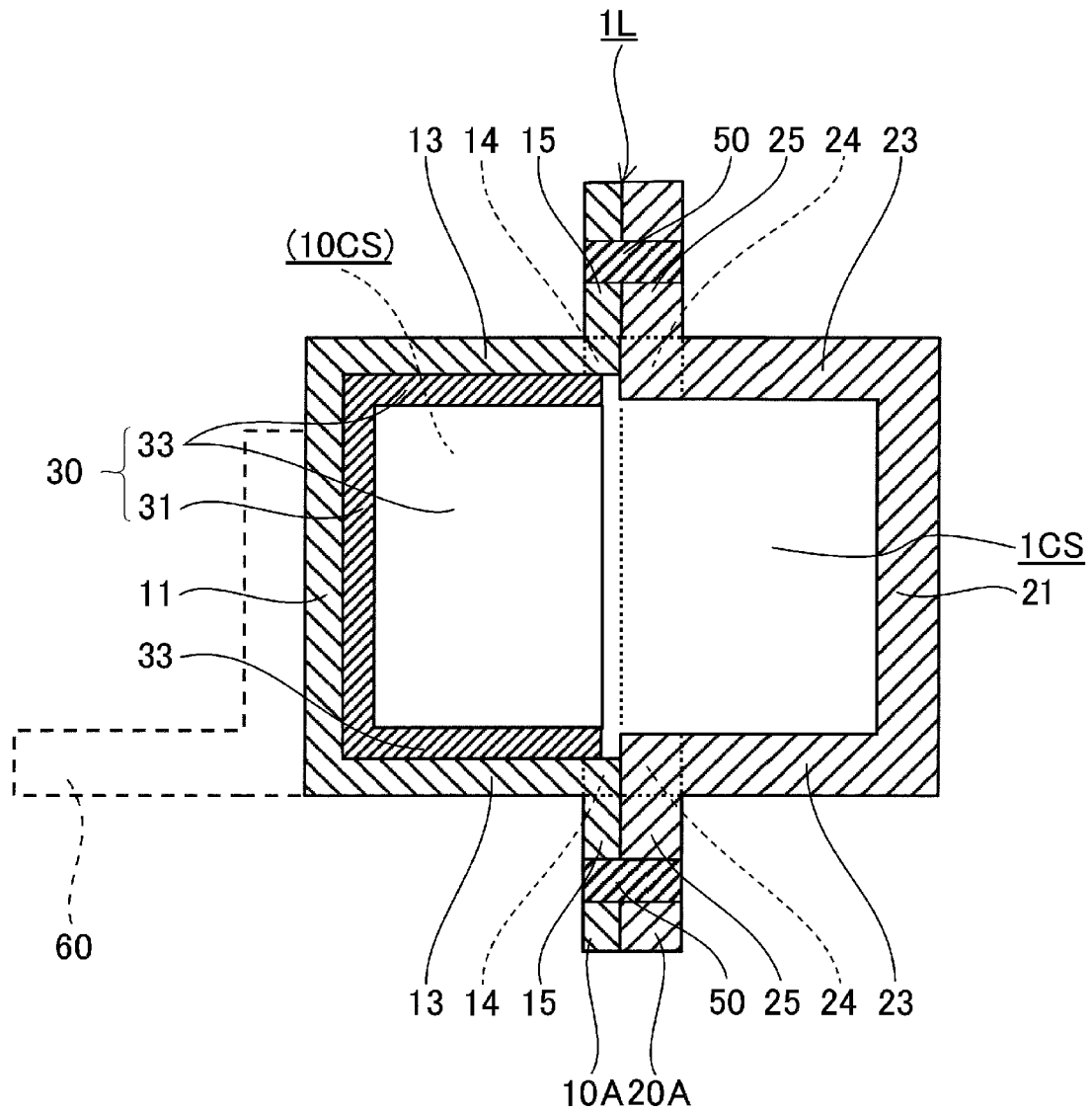
FIG. 17 is a schematic cross-sectional view of a main part of a body side panel according to a thirteenth embodiment.

FIG. 17 is a schematic cross-sectional view of a main part of the body side panel according to the thirteenth embodiment. Note that, FIG. 17 is a schematic cross-sectional view of the same part of the body side panel according to the thirteenth embodiment as that of the part illustrated in FIG. 1, which is taken along the line IV-IV.

As illustrated in FIG. 17, a body side panel 1L according to this embodiment is different from the body side panel 1H according to the foregoing ninth embodiment in that the structure of the body side panel is horizontally inverted with respect to the floor panel 60. In other words, as illustrated in FIG. 17, in the body side panel 1L according to this embodiment, the hat-like panel member 10 including the cross-sectionally hat-like portion 10A serves as the inner panel member, the other panel member 20 including the cross-sectionally flat-plate-like portion 20B serves as the outer panel member, and the reinforcing member 30 is joined to the inner panel member.

In such a body side panel, similar to the body side panel according to the ninth embodiment, an overall rigidity of the body side panel can be increased, and a weight of the body side panel can be reduced. Note that, when the body side panel according to the thirteenth embodiment and the body side panel according to the ninth embodiment are compared to each other from the viewpoints of increasing the overall rigidities of the body side panels and of reducing the weights of the same, the body side panel according to the ninth embodiment is preferred. Further, in the body side panel according to this embodiment, by increasing the thickness of the outer panel member, the overall rigidity of the body side panel against the load or the forced displacement from the outer side surface of the body side panel can be increased. Still further, the reinforcing member need not be joined to the outer panel member, and hence the formation of the sink marks on the outer side surface of the outer panel member can be prevented. As a result, the quality of the external appearance of the coating on the body side panel can be enhanced.

Currently, from a viewpoint of a capability to increase the overall rigidities of the body side panels and to reduce the weights of the same, the body side panels according to the first embodiment, the seventh embodiment, and the eighth embodiment are preferred.

Further, from a viewpoint of a capability to increase the overall rigidities of the body side panels, to reduce the weights of the same, and to increase productivities of the same, probably, the body side panels according to the first embodiment and the seventh embodiment are preferred.

Still further, from a viewpoint of a capability to increase the overall rigidities of the body side panels and to reduce the weights of the same without drastically changing the cross-sectional shapes of the conventionally used two panel members, the body side panel according to the eighth embodiment is preferred.

Yet further, from a viewpoint of a capability to increase the overall rigidities of the body side panels, to reduce the weights of the same, and to enhance the quality of the external appearances of the coatings on the same, the body side panels according to the eleventh embodiment and the twelfth embodiment are preferred.

The present invention has been explained by using several embodiments. However, the present invention is not limited to the foregoing several embodiments.

Specifically, the components of the body side panels according to the foregoing embodiments are not limited respectively to these embodiments. More specifically, the components of the foregoing embodiments may be used in combination with those of other ones of the embodiments, or details of the components of the foregoing embodiments may be changed.

REFERENCE SIGNS LIST 1, 1A, 1B, 1C, 1D, 1E, 1F, 1G, 1H, 1I, 1J, 1K, 1L Body side panel
$1O_1$, $1O_2$, $1O_3$ Opening portion
1CS Closed space
10 Hat-like panel member
10A Cross-sectionally hat-like portion
10CS Region
11 Top portion
13 Intermediate portion
14 Corner part
15 Edge portion
20 Other panel member
20A Cross-sectionally hat-like portion
20B Cross-sectionally flat-plate-like portion
21 Top portion
23 Intermediate portion
24 Corner part
25 Edge portion
27 Body portion
30 Reinforcing member
31 Layered portion
33 Rib portion
300 Carbon-fiber-reinforced thermoplastic resin
301 Carbon-fiber strand
303 Thermoplastic resin
40 Integral structure
50 Joint portion
60 Floor panel

The invention claimed is:

1. A body side panel, comprising:
a hat-like first panel member made of a metal, wherein the first panel member has opening portions into which a window or a door is assembled;
a second panel member made of a metal; and
a reinforcing member made of a resin, wherein:
the first panel member comprises a cross-sectionally hat-like portion formed of a top portion, edge portions, and intermediate portions coupling the top portion and the edge portions to each other,
the cross-sectionally hat-like portion is joined to the second panel member at the edge portions,
the cross-sectionally hat-like portion and the second panel member together form a closed space,
the reinforcing member is joined to at least one of the top portion or the intermediate portions in the closed space,
the first panel member comprises corner parts between the edge portions and the intermediate portions,
the second panel member comprises corresponding parts that correspond to the corner parts, and a rigidity of the corresponding parts is higher than a rigidity of the corner parts, and
the reinforcing member comprises a layered portion joined to an entirety of an inner surface of the top portion, and at least one rib portion that protrudes from the layered portion toward the second panel member so as to be spaced from the second panel member.

2. The body side panel according to claim 1, wherein the first panel member and the reinforcing member together form an integral structure, and a rigidity of the integral structure and a rigidity of the second panel member are equal to each other.

3. The body side panel according to claim 1, wherein the second panel member includes a cross-sectionally flat-plate-like portion.

4. The body side panel according to claim 1, wherein the reinforcing member is provided in a region in the closed space, the region being surrounded by the top portion and the intermediate portions.

5. The body side panel according to claim 1, wherein the first panel member serves as an outer panel member, and the second panel member serves as an inner panel member.

6. The body side panel according to claim 1, wherein the reinforcing member contains a carbon-fiber-reinforced thermoplastic resin.

7. The body side panel according to claim 1, wherein:
the reinforcing member contains a carbon-fiber-reinforced thermoplastic resin, and
carbon-fiber strands in the carbon-fiber-reinforced thermoplastic resin in the at least one rib portion are oriented in a direction orthogonal to a protruding direction of the at least one rib portion.

8. The body side panel according to claim 1, wherein a thickness of the second panel member is larger than a thickness of the first panel member.

9. The body side panel according to claim 1, wherein the first panel member serves as an inner panel member, and the second panel member serves as an outer panel member.

* * * * *